(12) United States Patent
Burokas et al.

(10) Patent No.: US 12,734,750 B2
(45) Date of Patent: Sep. 15, 2026

(54) UV CURING APPARATUS WITH LIGHT GUIDE AND IN-PROCESS RADIOMETRY

(71) Applicant: Divergent Technologies, Inc., Los Angeles, CA (US)

(72) Inventors: Vincent Arunas Burokas, Los Angeles, CA (US); Keith McKay, Los Angeles, CA (US); Jason Vincent Gallagher, Lomita, CA (US); Brian David Hayman, Huntington Beach, CA (US); Aron Derecichei, Los Alamitos, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 148 days.

(21) Appl. No.: 18/751,093

(22) Filed: Jun. 21, 2024

(65) Prior Publication Data

US 2024/0424731 A1 Dec. 26, 2024

Related U.S. Application Data

(60) Provisional application No. 63/510,082, filed on Jun. 23, 2023.

(51) Int. Cl.

| | |
|---|---|
| ***B29C 64/165*** | (2017.01) |
| ***B33Y 10/00*** | (2015.01) |
| ***B33Y 40/20*** | (2020.01) |

(52) U.S. Cl.

CPC ............ *B29C 64/165* (2017.08); *B33Y 10/00* (2014.12); *B33Y 40/20* (2020.01)

(58) Field of Classification Search

CPC ......... B33Y 40/20; B33Y 50/02; B33Y 10/00; B33Y 30/00; B22F 7/062; B22F 10/28;

(Continued)

(56) References Cited

U.S. PATENT DOCUMENTS 5,029,957 A 7/1991 Hood
5,203,226 A 4/1993 Hongou et al.

(Continued)

FOREIGN PATENT DOCUMENTS

CN 105675552 A 3/2020
DE 202013100318 U1 2/2013

(Continued)

OTHER PUBLICATIONS

US 9,202,136 B2, 12/2015, Schmidt et al. (withdrawn)

(Continued)

*Primary Examiner* — Monica A Huson
(74) *Attorney, Agent, or Firm* — ArentFox Schiff LLP

(57) ABSTRACT

Apparatus and methods for curing adhesives in a robotic assembly cell and evaluating the curing at a same time or in parallel are disclosed. An apparatus in accordance with an aspect of the present disclosure comprises a radiation source configured to emit radiation to cure an adhesive in a curing area during an assembly process, a radiation guide configured to transmit the radiation emitted from the radiation source to the curing area, and a sensor configured to measure a reflection of the transmitted radiation reflected off the curing area during the curing of the adhesive, wherein the sensor is positioned proximate to the radiation guide; and a controller configured to determine whether the measured reflection satisfies a threshold and, based on a determination that the measured reflection does not satisfy the threshold, to signal a remedial action of the assembly process.

24 Claims, 11 Drawing Sheets

(58) Field of Classification Search
CPC ... B29C 64/393; B29C 64/165; B29C 64/153; F16B 11/006
See application file for complete search history.

(56) References Cited

U.S. PATENT DOCUMENTS 5,742,385 A 4/1998 Champa
5,990,444 A 11/1999 Costin
6,010,155 A 1/2000 Rinehart
6,096,249 A 8/2000 Yamaguchi
6,140,602 A 10/2000 Costin
6,250,533 B1 6/2001 Otterbein et al.
6,252,196 B1 6/2001 Costin et al.
6,318,642 B1 11/2001 Goenka et al.
6,365,057 B1 4/2002 Whitehurst et al.
6,391,251 B1 5/2002 Keicher et al.
6,409,930 B1 6/2002 Whitehurst et al.
6,468,439 B1 10/2002 Whitehurst et al.
6,554,345 B2 4/2003 Jonsson
6,585,151 B1 7/2003 Ghosh
6,644,721 B1 11/2003 Miskech et al.
6,811,744 B2 11/2004 Keicher et al.
6,866,497 B2 3/2005 Saiki
6,919,035 B1 7/2005 Clough
6,926,970 B2 8/2005 James et al.
7,152,292 B2 12/2006 Hohmann et al.
7,344,186 B1 3/2008 Hausler et al.
7,500,373 B2 3/2009 Quell
7,586,062 B2 9/2009 Heberer
7,637,134 B2 12/2009 Burzlaff et al.
7,710,347 B2 5/2010 Gentilman et al.
7,716,802 B2 5/2010 Stern et al.
7,745,293 B2 6/2010 Yamazaki et al.
7,766,123 B2 8/2010 Sakurai et al.
7,852,388 B2 12/2010 Shimizu et al.
7,908,922 B2 3/2011 Zarabadi et al.
7,951,324 B2 5/2011 Naruse et al.
8,094,036 B2 1/2012 Heberer
8,163,077 B2 4/2012 Eron et al.
8,286,236 B2 10/2012 Jung et al.
8,289,352 B2 10/2012 Vartanian et al.
8,297,096 B2 10/2012 Mizumura et al.
8,354,170 B1 1/2013 Henry et al.
8,383,028 B2 2/2013 Lyons
8,408,036 B2 4/2013 Reith et al.
8,429,754 B2 4/2013 Jung et al.
8,437,513 B1 5/2013 Derakhshani et al.
8,444,903 B2 5/2013 Lyons et al.
8,452,073 B2 5/2013 Taminger et al.
8,599,301 B2 12/2013 Dowski, Jr. et al.
8,606,540 B2 12/2013 Haisty et al.
8,610,761 B2 12/2013 Haisty et al.
8,631,996 B2 1/2014 Quell et al.
8,675,925 B2 3/2014 Derakhshani et al.
8,678,060 B2 3/2014 Dietz et al.
8,686,314 B2 4/2014 Schneegans et al.
8,686,997 B2 4/2014 Radet et al.
8,694,284 B2 4/2014 Berard
8,720,876 B2 5/2014 Reith et al.
8,752,166 B2 6/2014 Jung et al.
8,755,923 B2 6/2014 Farahani et al.
8,787,628 B1 7/2014 Derakhshani et al.
8,818,771 B2 8/2014 Gielis et al.
8,841,634 B2 9/2014 Statham et al.
8,873,238 B2 10/2014 Wilkins
8,978,535 B2 3/2015 Ortiz et al.
9,006,605 B2 4/2015 Schneegans et al.
9,071,436 B2 6/2015 Jung et al.
9,101,979 B2 8/2015 Hofmann et al.
9,104,921 B2 8/2015 Derakhshani et al.
9,126,365 B1 9/2015 Mark et al.
9,128,476 B2 9/2015 Jung et al.
9,138,924 B2 9/2015 Yen
9,149,988 B2 10/2015 Mark et al.
9,156,205 B2 10/2015 Mark et al.
9,186,848 B2 11/2015 Mark et al.
9,244,986 B2 1/2016 Karmarkar
9,248,611 B2 2/2016 Divine et al.
9,254,535 B2 2/2016 Buller et al.
9,266,566 B2 2/2016 Kim
9,269,022 B2 2/2016 Rhoads et al.
9,327,452 B2 5/2016 Mark et al.
9,329,020 B1 5/2016 Napoletano
9,332,251 B2 5/2016 Haisty et al.
9,346,127 B2 5/2016 Buller et al.
9,389,315 B2 7/2016 Bruder et al.
9,399,256 B2 7/2016 Buller et al.
9,403,235 B2 8/2016 Buller et al.
9,418,193 B2 8/2016 Dowski, Jr. et al.
9,457,514 B2 10/2016 Schwärzler
9,469,057 B2 10/2016 Johnson et al.
9,478,063 B2 10/2016 Rhoads et al.
9,481,402 B1 11/2016 Muto et al.
9,486,878 B2 11/2016 Buller et al.
9,486,960 B2 11/2016 Paschkewitz et al.
9,502,993 B2 11/2016 Deng
9,525,262 B2 12/2016 Stuart et al.
9,533,526 B1 1/2017 Nevins
9,555,315 B2 1/2017 Aders
9,555,580 B1 1/2017 Dykstra et al.
9,557,856 B2 1/2017 Send et al.
9,566,742 B2 2/2017 Keating et al.
9,566,758 B2 2/2017 Cheung et al.
9,573,193 B2 2/2017 Buller et al.
9,573,225 B2 2/2017 Buller et al.
9,586,290 B2 3/2017 Buller et al.
9,595,795 B2 3/2017 Lane et al.
9,597,843 B2 3/2017 Stauffer et al.
9,600,929 B1 3/2017 Young et al.
9,609,755 B2 3/2017 Coull et al.
9,610,737 B2 4/2017 Johnson et al.
9,611,667 B2 4/2017 GangaRao et al.
9,616,623 B2 4/2017 Johnson et al.
9,626,487 B2 4/2017 Jung et al.
9,626,489 B2 4/2017 Nilsson
9,643,361 B2 5/2017 Liu
9,662,840 B1 5/2017 Buller et al.
9,665,182 B2 5/2017 Send et al.
9,672,389 B1 6/2017 Mosterman et al.
9,672,550 B2 6/2017 Apsley et al.
9,676,145 B2 6/2017 Buller et al.
9,684,919 B2 6/2017 Apsley et al.
9,688,032 B2 6/2017 Kia et al.
9,690,286 B2 6/2017 Hovsepian et al.
9,700,966 B2 7/2017 Kraft et al.
9,703,896 B2 7/2017 Zhang et al.
9,713,903 B2 7/2017 Paschkewitz et al.
9,718,302 B2 8/2017 Young et al.
9,718,434 B2 8/2017 Hector, Jr. et al.
9,724,877 B2 8/2017 Flitsch et al.
9,724,881 B2 8/2017 Johnson et al.
9,725,178 B2 8/2017 Wang
9,731,730 B2 8/2017 Stiles
9,731,773 B2 8/2017 Gami et al.
9,741,954 B2 8/2017 Bruder et al.
9,747,352 B2 8/2017 Karmarkar
9,764,415 B2 9/2017 Seufzer et al.
9,764,520 B2 9/2017 Johnson et al.
9,765,226 B2 9/2017 Dain
9,770,760 B2 9/2017 Liu
9,773,393 B2 9/2017 Velez
9,776,234 B2 10/2017 Schaafhausen et al.
9,782,936 B2 10/2017 Glunz et al.
9,783,324 B2 10/2017 Embler et al.
9,783,977 B2 10/2017 Alqasimi et al.
9,789,548 B2 10/2017 Golshany et al.
9,789,922 B2 10/2017 Dosenbach et al.
9,796,137 B2 10/2017 Zhang et al.
9,802,108 B2 10/2017 Aders
9,809,977 B2 11/2017 Carney et al.
9,817,922 B2 11/2017 Glunz et al.
9,818,071 B2 11/2017 Jung et al.
9,821,339 B2 11/2017 Paschkewitz et al.
9,821,411 B2 11/2017 Buller et al.

(56) References Cited

U.S. PATENT DOCUMENTS 9,823,143 B2 11/2017 Twelves, Jr. et al.
9,829,564 B2 11/2017 Bruder et al.
9,846,933 B2 12/2017 Yuksel
9,854,828 B2 1/2018 Langeland
9,858,604 B2 1/2018 Apsley et al.
9,862,833 B2 1/2018 Hasegawa et al.
9,862,834 B2 1/2018 Hasegawa et al.
9,863,885 B2 1/2018 Zaretski et al.
9,870,629 B2 1/2018 Cardno et al.
9,879,981 B1 1/2018 Dehghan Niri et al.
9,884,663 B2 2/2018 Czinger et al.
9,898,776 B2 2/2018 Apsley et al.
9,914,150 B2 3/2018 Pettersson et al.
9,919,360 B2 3/2018 Buller et al.
9,931,697 B2 4/2018 Levin et al.
9,933,031 B2 4/2018 Bracamonte et al.
9,933,092 B2 4/2018 Sindelar
9,957,031 B2 5/2018 Golshany et al.
9,958,535 B2 5/2018 Send et al.
9,962,767 B2 5/2018 Buller et al.
9,963,978 B2 5/2018 Johnson et al.
9,971,920 B2 5/2018 Derakhshani et al.
9,976,063 B2 5/2018 Childers et al.
9,987,792 B2 6/2018 Flitsch et al.
9,988,136 B2 6/2018 Tiryaki et al.
9,989,623 B2 6/2018 Send et al.
9,990,565 B2 6/2018 Rhoads et al.
9,994,339 B2 6/2018 Colson et al.
9,996,890 B1 6/2018 Cinnamon et al.
9,996,945 B1 6/2018 Holzer et al.
10,002,215 B2 6/2018 Dowski et al.
10,006,156 B2 6/2018 Kirkpatrick
10,011,089 B2 7/2018 Lyons et al.
10,011,685 B2 7/2018 Childers et al.
10,012,532 B2 7/2018 Send et al.
10,013,777 B2 7/2018 Mariampillai et al.
10,015,908 B2 7/2018 Williams et al.
10,016,852 B2 7/2018 Broda
10,016,942 B2 7/2018 Mark et al.
10,017,384 B1 7/2018 Greer et al.
10,018,576 B2 7/2018 Herbsommer et al.
10,022,792 B2 7/2018 Srivas et al.
10,022,912 B2 7/2018 Kia et al.
10,027,376 B2 7/2018 Sankaran et al.
10,029,415 B2 7/2018 Swanson et al.
10,040,239 B2 8/2018 Brown, Jr.
10,046,412 B2 8/2018 Blackmore
10,048,769 B2 8/2018 Selker et al.
10,052,712 B2 8/2018 Blackmore
10,052,820 B2 8/2018 Kemmer et al.
10,055,536 B2 8/2018 Maes et al.
10,058,764 B2 8/2018 Aders
10,058,920 B2 8/2018 Buller et al.
10,061,906 B2 8/2018 Nilsson
10,065,270 B2 9/2018 Buller et al.
10,065,361 B2 9/2018 Susnjara et al.
10,065,367 B2 9/2018 Brown, Jr.
10,068,316 B1 9/2018 Holzer et al.
10,071,422 B2 9/2018 Buller et al.
10,071,525 B2 9/2018 Susnjara et al.
10,072,179 B2 9/2018 Drijfhout
10,074,128 B2 9/2018 Colson et al.
10,076,875 B2 9/2018 Mark et al.
10,076,876 B2 9/2018 Mark et al.
10,081,140 B2 9/2018 Paesano et al.
10,081,431 B2 9/2018 Seack et al.
10,086,568 B2 10/2018 Snyder et al.
10,087,320 B2 10/2018 Simmons et al.
10,087,556 B2 10/2018 Gallucci et al.
10,099,427 B2 10/2018 Mark et al.
10,100,542 B2 10/2018 GangaRao et al.
10,100,890 B2 10/2018 Bracamonte et al.
10,107,344 B2 10/2018 Bracamonte et al.
10,108,766 B2 10/2018 Druckman et al.
10,113,600 B2 10/2018 Bracamonte et al.
10,118,347 B2 11/2018 Stauffer et al.
10,118,579 B2 11/2018 Lakic
10,120,078 B2 11/2018 Bruder et al.
10,124,546 B2 11/2018 Johnson et al.
10,124,570 B2 11/2018 Evans et al.
10,137,500 B2 11/2018 Blackmore
10,138,354 B2 11/2018 Groos et al.
10,144,126 B2 12/2018 Krohne et al.
10,145,110 B2 12/2018 Carney et al.
10,151,363 B2 12/2018 Bracamonte et al.
10,152,661 B2 12/2018 Kieser
10,160,278 B2 12/2018 Coombs et al.
10,161,021 B2 12/2018 Lin et al.
10,166,752 B2 1/2019 Evans et al.
10,166,753 B2 1/2019 Evans et al.
10,171,578 B1 1/2019 Cook et al.
10,173,255 B2 1/2019 TenHouten et al.
10,173,327 B2 1/2019 Kraft et al.
10,178,800 B2 1/2019 Mahalingam et al.
10,179,640 B2 1/2019 Wilkerson
10,183,330 B2 1/2019 Buller et al.
10,183,478 B2 1/2019 Evans et al.
10,189,187 B2 1/2019 Keating et al.
10,189,240 B2 1/2019 Evans et al.
10,189,241 B2 1/2019 Evans et al.
10,189,242 B2 1/2019 Evans et al.
10,190,424 B2 1/2019 Johnson et al.
10,195,693 B2 2/2019 Buller et al.
10,196,539 B2 2/2019 Boonen et al.
10,197,338 B2 2/2019 Melsheimer
10,200,677 B2 2/2019 Trevor et al.
10,201,932 B2 2/2019 Flitsch et al.
10,201,941 B2 2/2019 Evans et al.
10,202,673 B2 2/2019 Lin et al.
10,204,216 B2 2/2019 Nejati et al.
10,207,454 B2 2/2019 Buller et al.
10,209,065 B2 2/2019 Estevo, Jr. et al.
10,210,662 B2 2/2019 Holzer et al.
10,213,837 B2 2/2019 Kondoh
10,214,248 B2 2/2019 Hall et al.
10,214,252 B2 2/2019 Schellekens et al.
10,214,275 B2 2/2019 Goehlich
10,220,575 B2 3/2019 Reznar
10,220,881 B2 3/2019 Tyan et al.
10,221,530 B2 3/2019 Driskell et al.
10,226,900 B1 3/2019 Nevins
10,232,550 B2 3/2019 Evans et al.
10,234,342 B2 3/2019 Moorlag et al.
10,237,477 B2 3/2019 Trevor et al.
10,252,335 B2 4/2019 Buller et al.
10,252,336 B2 4/2019 Buller et al.
10,254,499 B1 4/2019 Cohen et al.
10,257,499 B2 4/2019 Hintz et al.
10,259,044 B2 4/2019 Buller et al.
10,268,181 B1 4/2019 Nevins
10,269,225 B2 4/2019 Velez
10,272,860 B2 4/2019 Mohapatra et al.
10,272,862 B2 4/2019 Whitehead
10,275,564 B2 4/2019 Ridgeway et al.
10,279,580 B2 5/2019 Evans et al.
10,285,219 B2 5/2019 Fetfatsidis et al.
10,286,452 B2 5/2019 Buller et al.
10,286,603 B2 5/2019 Buller et al.
10,286,961 B2 5/2019 Hillebrecht et al.
10,289,263 B2 5/2019 Troy et al.
10,289,875 B2 5/2019 Singh et al.
10,291,193 B2 5/2019 Dandu et al.
10,294,552 B2 5/2019 Liu et al.
10,294,982 B2 5/2019 Gabrys et al.
10,295,989 B1 5/2019 Nevins
10,303,159 B2 5/2019 Czinger et al.
10,307,824 B2 6/2019 Kondoh
10,310,197 B1 6/2019 Droz et al.
10,313,651 B2 6/2019 Trevor et al.
10,315,252 B2 6/2019 Mendelsberg et al.
10,336,050 B2 7/2019 Susnjara
10,337,542 B2 7/2019 Hesslewood et al.
10,337,952 B2 7/2019 Bosetti et al.
10,339,266 B2 7/2019 Urick et al.

(56) References Cited

U.S. PATENT DOCUMENTS

| | | | |
|---|---|---|---|
| 10,343,330 | B2 | 7/2019 | Evans et al. |
| 10,343,331 | B2 | 7/2019 | McCall et al. |
| 10,343,355 | B2 | 7/2019 | Evans et al. |
| 10,343,724 | B2 | 7/2019 | Polewarczyk et al. |
| 10,343,725 | B2 | 7/2019 | Martin et al. |
| 10,350,823 | B2 | 7/2019 | Rolland et al. |
| 10,356,341 | B2 | 7/2019 | Holzer et al. |
| 10,356,395 | B2 | 7/2019 | Holzer et al. |
| 10,357,829 | B2 | 7/2019 | Spink et al. |
| 10,357,957 | B2 | 7/2019 | Buller et al. |
| 10,359,756 | B2 | 7/2019 | Newell et al. |
| 10,369,629 | B2 | 8/2019 | Mendelsberg et al. |
| 10,382,739 | B1 | 8/2019 | Rusu et al. |
| 10,384,393 | B2 | 8/2019 | Xu et al. |
| 10,384,416 | B2 | 8/2019 | Cheung et al. |
| 10,389,410 | B2 | 8/2019 | Brooks et al. |
| 10,391,710 | B2 | 8/2019 | Mondesir |
| 10,392,097 | B2 | 8/2019 | Pham et al. |
| 10,392,131 | B2 | 8/2019 | Deck et al. |
| 10,393,315 | B2 | 8/2019 | Tyan |
| 10,400,080 | B2 | 9/2019 | Ramakrishnan et al. |
| 10,401,832 | B2 | 9/2019 | Snyder et al. |
| 10,403,009 | B2 | 9/2019 | Mariampillai et al. |
| 10,406,750 | B2 | 9/2019 | Barton et al. |
| 10,412,283 | B2 | 9/2019 | Send et al. |
| 10,416,095 | B2 | 9/2019 | Herbsommer et al. |
| 10,421,496 | B2 | 9/2019 | Swayne et al. |
| 10,421,863 | B2 | 9/2019 | Hasegawa et al. |
| 10,422,478 | B2 | 9/2019 | Leachman et al. |
| 10,425,793 | B2 | 9/2019 | Sankaran et al. |
| 10,427,364 | B2 | 10/2019 | Alves |
| 10,429,006 | B2 | 10/2019 | Tyan et al. |
| 10,434,573 | B2 | 10/2019 | Buller et al. |
| 10,435,185 | B2 | 10/2019 | Divine et al. |
| 10,435,773 | B2 | 10/2019 | Liu et al. |
| 10,436,038 | B2 | 10/2019 | Buhler et al. |
| 10,438,407 | B2 | 10/2019 | Pavanaskar et al. |
| 10,440,351 | B2 | 10/2019 | Holzer et al. |
| 10,442,002 | B2 | 10/2019 | Benthien et al. |
| 10,442,003 | B2 | 10/2019 | Symeonidis et al. |
| 10,449,696 | B2 | 10/2019 | Elgar et al. |
| 10,449,737 | B2 | 10/2019 | Johnson et al. |
| 10,461,810 | B2 | 10/2019 | Cook et al. |
| 2005/0169575 | A1 | 8/2005 | Dimas et al. |
| 2006/0108783 | A1 | 5/2006 | Ni et al. |
| 2008/0225270 | A1 | 9/2008 | Senga et al. |
| 2009/0159779 | A1 | 6/2009 | Lu |
| 2013/0026381 | A1 | 1/2013 | Huang et al. |
| 2014/0277669 | A1 | 9/2014 | Nardi et al. |
| 2017/0113344 | A1 | 4/2017 | Schönberg |
| 2017/0341309 | A1 | 11/2017 | Piepenbrock et al. |
| 2019/0357976 | A1 | 11/2019 | Youngquist et al. |
| 2022/0371095 | A1 | 11/2022 | Gallagher et al. |

FOREIGN PATENT DOCUMENTS

| | | | |
|---|---|---|---|
| WO | 1996036455 | A1 | 11/1996 |
| WO | 1996036525 | A1 | 11/1996 |
| WO | 1996038260 | A1 | 12/1996 |
| WO | 2003024641 | A1 | 3/2003 |
| WO | 2004108343 | A1 | 12/2004 |
| WO | 2005093773 | A1 | 10/2005 |
| WO | 2007003375 | A1 | 1/2007 |
| WO | 2007110235 | A1 | 10/2007 |
| WO | 2007110236 | A1 | 10/2007 |
| WO | 2008019847 | A1 | 2/2008 |
| WO | 2007128586 | A3 | 6/2008 |
| WO | 2008068314 | A2 | 6/2008 |
| WO | 2008086994 | A1 | 7/2008 |
| WO | 2008087024 | A1 | 7/2008 |
| WO | 2008107130 | A1 | 9/2008 |
| WO | 2008138503 | A1 | 11/2008 |
| WO | 2008145396 | A1 | 12/2008 |
| WO | 2009083609 | A2 | 7/2009 |
| WO | 2009098285 | A1 | 8/2009 |
| WO | 2009112520 | A1 | 9/2009 |
| WO | 2009135938 | A1 | 11/2009 |
| WO | 2009140977 | A1 | 11/2009 |
| WO | 2010125057 | A2 | 11/2010 |
| WO | 2010125058 | A1 | 11/2010 |
| WO | 2010142703 | A2 | 12/2010 |
| WO | 2011032533 | A1 | 3/2011 |
| WO | 2014016437 | A1 | 1/2014 |
| WO | 2014187720 | A1 | 11/2014 |
| WO | 2014195340 | A1 | 12/2014 |
| WO | 2015193331 | A1 | 12/2015 |
| WO | 2016116414 | A1 | 7/2016 |
| WO | 2017036461 | A1 | 3/2017 |
| WO | 2019030248 | A1 | 2/2019 |
| WO | 2019042504 | A1 | 3/2019 |
| WO | 2019048010 | A1 | 3/2019 |
| WO | 2019048498 | A1 | 3/2019 |
| WO | 2019048680 | A1 | 3/2019 |
| WO | 2019048682 | A1 | 3/2019 |

OTHER PUBLICATIONS

US 9,809,265 B2, 11/2017, Kinjo (withdrawn)

US 10,449,880 B2, 10/2019, Mizobata et al. (withdrawn)

International Search Report and Written Opinion, issued by International Searching Authority in International Application No. PCT/US2024/035143, mailed on Sep. 17, 2024.

Hongchang Deng, Xiaowen Jiang, Rui Wang, Ronghui Xu, Chuanxin Teng, Ming Chen, Wentao Zhang, Libo Yuan, & Shijie Deng. (2021). Real-time monitoring of UV curing by fiber-integrated Fabry-Perot sensor. Optics Communications, vol. 496, 127143, ISSN 0030-4018.

UV CURING APPARATUS WITH LIGHT GUIDE AND IN-PROCESS RADIOMETRY

CROSS-REFERENCE TO RELATED APPLICATIONS

This application claims priority to U.S. Provisional Application No. 63/510,082 titled "UV Curing Apparatus with Light Guide and In-Process Radiometry," filed on Jun. 23, 2023, which is assigned to the assignee hereof, and incorporated herein by reference in its entirety as if fully set forth herein.

BACKGROUND

Field

The present disclosure relates generally to additive manufacturing, and more specifically to curing adhesives in a robotic assembly cell.

Background

Three-dimensional (3-D) printing, also referred to as additive manufacturing (AM), has recently presented new opportunities to more efficiently build complex transport structures, such as automobiles, aircraft, boats, motorcycles, busses, trains, and the like. AM techniques are capable of fabricating complex components from a wide variety of materials. Applying AM processes to industries that produce these products has proven to produce a structurally more efficient transport structure. For example, an automobile produced using 3-D printed components can be made stronger, lighter, and consequently, more fuel efficient. Moreover, AM enables manufacturers to 3-D print components that are much more complex and that are equipped with more advanced features and capabilities than components made via traditional machining and casting techniques. The 3-D objects may be formed using layers of material based on a digital model data of the object. A 3-D printer may form the structure defined by the digital model data by printing the structure one layer at a time.

3-D printing is non-design specific, which offers geometric and design flexibility that conventional manufacturing processes cannot. Furthermore, 3-D printing technologies can produce parts with very small feature sizes, and geometries that are either significantly difficult or impossible to produce using conventional manufacturing processes.

Despite these recent advances, a number of obstacles remain with respect to the practical implementation of AM techniques in transport structures and other mechanized assemblies. For instance, regardless of whether AM is used to produce various components of such devices, manufacturers typically rely on labor-intensive and expensive techniques such as welding, riveting, etc., to join components together, such as nodes used in a transport structure. The deficiencies associated with welding and similar techniques are equally applicable to components, such as a vehicle gear case, that are currently too large to 3-D print in a single AM step. A given 3-D printer is usually limited to rendering objects having a finite size, often dictated by the available surface area of the 3-D printer's build plate and the allowable volume the printer can accommodate. In these instances, manufacturers are often relegated to building the component using the traditional, expensive and time-consuming machining techniques. Alternatively, manufacturers May 3-D print a number of subcomponents and combine them to form a complete, functional component.

SUMMARY

Several aspects of apparatus for systems and methods for joint designs for adhesive fixturing will be described more fully hereinafter with reference to three-dimensional printing techniques.

An apparatus in accordance with an aspect of the present disclosure comprises a radiation head having a radiation source configured to emit radiation to cure an adhesive in a curing area during an assembly process, a radiation guide configured to transmit the radiation emitted from the radiation source to the curing area, and a sensor configured to measure a reflection of the transmitted radiation reflected off the curing area during the curing of the adhesive, wherein the sensor is positioned proximate to the radiation guide; and a controller configured to determine whether the measured reflection satisfies a threshold and, based on a determination that the measured reflection does not satisfy the threshold, to signal a remedial action of the assembly process.

Such an apparatus may optionally include the radiation guide having a fused quartz rod.

Such an apparatus may also optionally comprises the radiation source emitting radiation and determining whether the measured reflection satisfies the threshold in parallel.

Such an apparatus may also optionally comprises the controller being further configured to, based on a determination that the measured reflection satisfies the threshold, continuing to a subsequent step within the assembly process.

Such an apparatus may also optionally comprise the remedial actions including stopping the assembly process or applying additional radiation to the adhesive.

Such an apparatus may also optionally comprise the controller being further configured to adjust the threshold according to different cures.

Such an apparatus may optionally comprise the controller being further configured to signal the remedial action based on a delta between the measured reflection and the threshold.

Such an apparatus further optionally comprises the movement of the radiation head being an angular movement that changes the direction of radiation emitting from the radiation head.

Such an apparatus further optionally includes a light shroud configured to receive the radiation sourced, the radiation guide, and the sensor.

Such an apparatus may further optionally include a chassis, a heatsink coupled to the light shroud, a gearbox coupled to the chassis, and a mounting arm coupled between the gearbox and the heatsink.

Such an apparatus may further optionally include the radiation source including an ultraviolet (UV) source and the adhesive including a UV-cured adhesive.

A method in accordance with an aspect of the present disclosure comprises approaching a feature on a curing surface of a second part to be joined, via a robotic process, with a first part, performing a curing process within an assembly process by emitting, via a radiation source, radiation to cure an adhesive in a curing area during the assembly process, transmitting, via a radiation guide, the radiation emitted from the radiation source to the curing area; performing an in-process verification check within the assembly process by measuring, via a sensor, a reflection of the transmitted radiation reflected off the curing area during the curing of the adhesive, wherein the sensor is positioned proximate to the radiation guide, determining whether the measured reflection satisfies a threshold, and based on a determination that the measured reflection does not satisfy the threshold, signal a remedial action of the assembly process.

Such method may also comprise the radiation guide having a fused quartz rod.

Such method may also comprise the radiation source emitting the radiation and determining whether the measured reflection satisfies the threshold in parallel.

Such method may also comprise, based on a determination that the measured reflection satisfies the threshold, continuing to a subsequent step within the assembly process.

Such method may also comprise the remedial action including stopping the assembly process or applying additional radiation to the adhesive.

Such method may also comprise adjusting the threshold according to different cures.

Such method may also comprise the remedial action being signaled based on a delta between the measured reflection and the threshold.

Such method may also comprise the radiation source including a UV source, and the adhesive including a UV-cured adhesive.

Such method may also comprise the radiation source, the sensor, and the radiation guide being combined in an end effector. Such method includes the end effector being movable in an angular movement that changes a direction of the radiation emitting from the radiation source.

Such method further comprises the first part and the second part being additively manufactured retention joints.

It will be understood that other aspects of joining structures (or structures) and subcomponents will become readily apparent to those skilled in the art from the following detailed description, wherein it is shown and described only several embodiments by way of illustration. As will be realized by those skilled in the art, the apparatus for adhesive fixturing is capable of other and different embodiments, and its several details are capable of modification in various other respects, all without departing from the invention. Accordingly, the drawings and detailed description are to be regarded as illustrative in nature and not as restrictive.

BRIEF DESCRIPTION OF THE DRA WINGS

Various aspects of apparatus and methods for printing joints with additively manufactured structures will now be presented in the detailed description by way of example, and not by way of limitation, in the accompanying drawings, wherein.

DETAILED DESCRIPTION

Figure 1A:
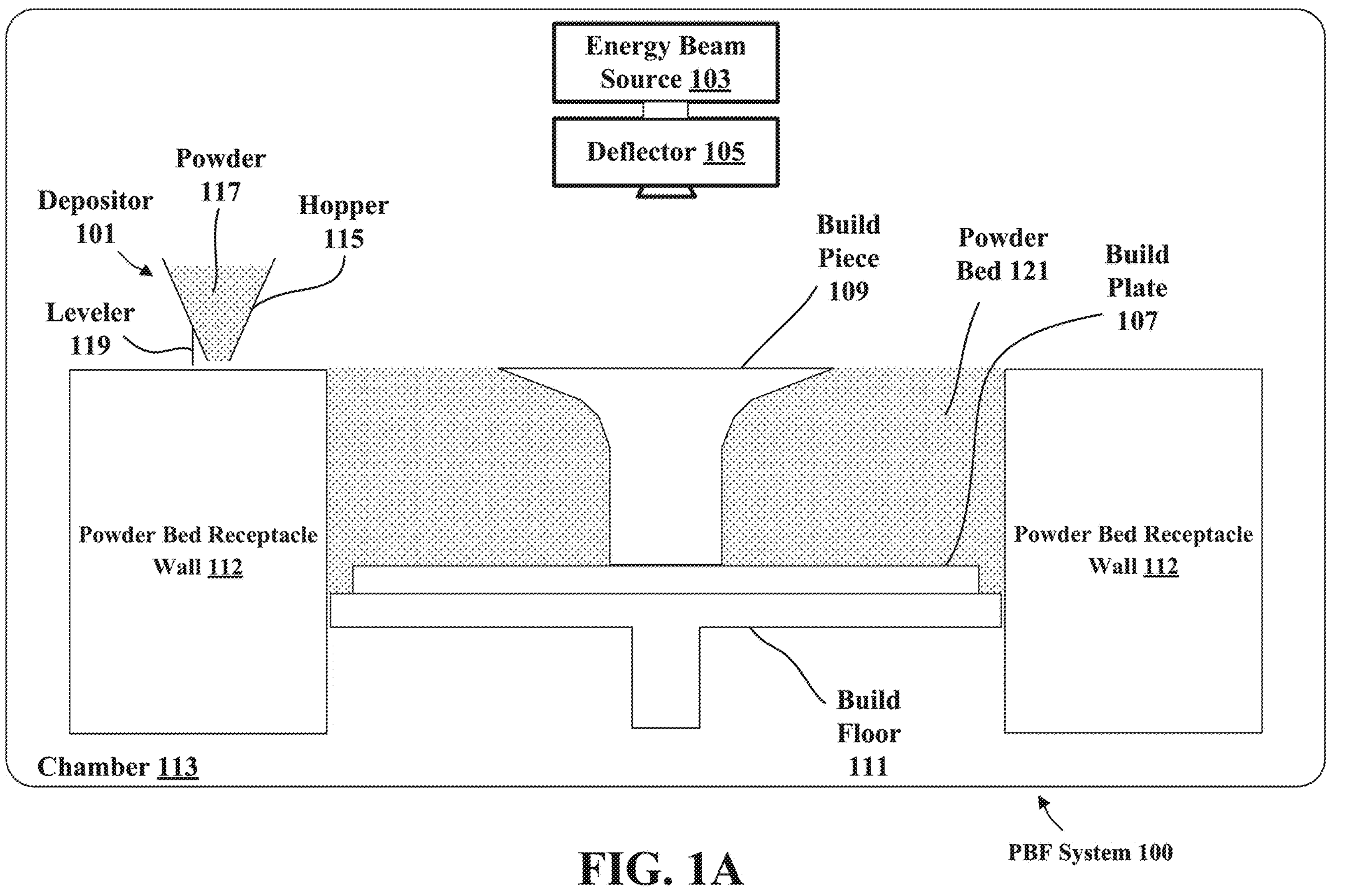
FIGS. 1A-1D illustrate respective side views of a 3-D printer system in accordance with an aspect of the present disclosure.

The detailed description set forth below in connection with the drawings is intended to provide a description of exemplary embodiments of joining additively manufactured structures (or structures) and subcomponents, and it is not intended to represent the only embodiments in which the disclosure may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the disclosure to those skilled in the art. However, the disclosure may be practiced without these specific details. In some instances, well-known structures and components may be shown in block diagram form, or omitted entirely, in order to avoid obscuring the various concepts presented throughout this disclosure.

Additive Manufacturing

Additive Manufacturing (AM) involves the use of a stored geometrical model for accumulating layered materials on a build plate to produce a three-dimensional (3-D) build piece having features defined by the model. AM techniques are capable of printing complex components using a wide variety of materials. A 3-D object may be fabricated based on a computer aided design (CAD) model. The CAD model can be used to generate a set of instructions or commands that are compatible with a particular 3-D printer. The AM process can create a solid three-dimensional object using the CAD model and print instructions. In the AM process, different materials or combinations of material, such as engineered plastics, thermoplastic elastomers, metals, ceramics, and/or alloys or combinations of the above, etc., may be used to create a uniquely shaped 3-dimensional object.

The use of AM in the context of joining two or more components may provide significant flexibility and cost saving benefits. These, and other benefits may enable manufacturers of mechanical structures to produce components at a lower cost and/or in a more efficient manner. The joining techniques described in the present disclosure relate to a process for connecting AM components and/or commercial off the shelf (COTS) components. AM components are 3-D components that are printed by, for example, adding layer upon layer of one or more materials based on a preprogramed design. The components described herein may be components used to assemble a variety of devices, such as engine components, structural components, etc. Further, such AM or COTS components may be used in assemblies, such as vehicles, trucks, trains, motorcycles, boats, aircraft, and the like, or other mechanized assemblies, without departing from the scope of the present disclosure.

Components and Terminology in AM

In an aspect of the present disclosure, a component is an example of an AM component. A component may be any 3-D printed component that includes features, such as an interface, for mating with another component. The component may have internal or external features configured to accept a particular type of component. Alternatively or additionally, the component may be shaped to accept a particular type of component. A component may utilize any internal design or shape and accept any variety of components without departing from the scope of the disclosure.

A component interface may be configured to connect to an interface of another component. For example, and not by way of limitation, an interface between components may be a tongue-and-groove structure. The interface may have high precision features or complex geometries that allow them to perform specific functions, including creating connections to spanning structures such as tubes, structural panels, extrusions, sheet metal, and/or other structural members.

For clarity, components may also include relatively simple connection features configured to connect with the more sophisticated network of connection features of the interface to form streamlined connections between structures. While these components may incorporate more basic features, they advantageously may be 3-D printed at a higher print rate. Alternatively, components may be built using a suitable non 3-D print manufacturing technology.

A number of different AM technologies may be well-suited for construction of components in a transport structure or other mechanized assembly. Such 3-D printing techniques may include, for example, directed energy deposition (DED), selective laser melting (SLM), selective laser sintering (SLS), direct metal laser sintering (DMLS), electron beam melting (EBM), powder bed fusion (PBF), and/or other AM processes involving melting or fusion of metallic powders.

As in many 3-D printing techniques, these processes (e.g., PBF systems) can create build pieces layer-by-layer. Each layer or "slice" is formed by depositing a layer of powder and exposing portions of the powder to an energy beam. The energy beam is applied to melt areas of the powder layer that coincide with the cross-section of the build piece in the layer. The melted powder cools and fuses to form a slice of the build piece. The process can be repeated to form the next slice of the build piece, and so on. Each layer is deposited on top of the previous layer. The resulting structure is a build piece assembled slice-by-slice from the ground up. SLS and various other PBF techniques may be well suited to construction of gear cases and other transport structure components. However, it will be appreciated that other AM techniques, such as fused deposition modeling (FDM) and the like, are also possible for use in such applications.

A tongue-and-groove (TNG) structure may be used to connect two or more components at an interface. For example, a tongue portion of one component may extend all the way around a peripheral region as a single protrusion disposed around the peripheral region. The tongue portion of a component may protrude outward along the peripheral region relative to that component, and the lateral extension of the tongue portion can be considered in this view as "coming out" of that component.

A groove portion of an interface is a portion of a second component and may be disposed along a peripheral region of the second component. The groove portion may, but need not, comprise the material of the second component. The groove portion may extend all the way around the peripheral region and may be a single channel in the second component. The groove portion may also be inset inward along the peripheral region relative to the second component and runs laterally around the second component. The tongue and groove may be arranged on the first and second components such that when the two components are placed into contact, the tongue may align with the groove and may fit into the groove around the peripheral regions at the interface between the two components.

While the disclosure relates primarily to using a tongue-and-groove structure to join two or more components, the techniques described in this disclosure are not only applicable to tongue-and-groove structures. In fact, any suitable technique for joining multiple structures may be used without departing from the scope of the disclosure.

AM may include the manufacture of one or more nodes. A node is a structural member that may include one or more interfaces used to connect to other nodes or spanning components such as tubes, extrusions, panels, and the like. Using AM, a node may be constructed to include additional features and functions, including interface functions, depending on the objectives. As described herein, the term node and structure may be used interchangeably.

As described above, nodes and other components may be connected together. For example, one or more nodes and/or other components may be connected together to form larger components. Accordingly, individual AM structures often need to be connected together, or individual AM structures often need to be connected to machined or COTS parts, to provide combined structures, e.g., to realize the above modular network or to form a complex interior assembly in a vehicle. Examples include structure-to-structure connections, structure-to-panel connections, structure-to-tube connections, and structure-extrusion connections, among others. To connect an AM joint member with a vehicle body panel, for example, mechanical connectors (e.g., screws, clamps, etc.) may be used. Alternatively or additionally, an adhesive may be used to form a strong bond. For connecting these parts, a strict tolerance is often required, meaning that the parts must be positioned to fit precisely in an established orientation. For example, the two parts to be adhered may need to be positioned to avoid direct contact with each other in order to mitigate possible galvanic corrosion problems. In general, an adhesive connection between the AM joint member and panel should result in an accurate fit. Thus, the AM joint member should not be misaligned with or offset from the body panel, for example, and the parts should remain properly oriented when a permanent bond is established.

The present disclosure is directed to curing adhesive and evaluating the curing adhesive in real-time in robotic assembly cells.

Additive Manufacturing Environment

FIGS. 1A-1D illustrate respective side views of a 3-D printer system in an aspect of the present disclosure.

In an aspect of the present disclosure, a 3-D printer system may be a powder-bed fusion (PBF) system 100. FIGS. 1A-D show PBF system 100 during different stages of operation. The particular embodiment illustrated in FIGS. 1A-1D is one of many suitable examples of a PBF system employing principles of this disclosure. It should also be noted that elements of FIGS. 1A-1D and the other figures in this disclosure are not necessarily drawn to scale, but may be drawn larger or smaller for the purpose of better illustration of concepts described herein. PBF system 100 can include a depositor 101 that can deposit each layer of metal powder, an energy beam source 103 that can generate an energy beam, a deflector 105 that can apply the energy beam to fuse the powder material, and a build plate 107 that can support one or more build pieces, such as a build piece 109. Although the terms "fuse" and/or "fusing" are used to describe the mechanical coupling of the powder particles, other mechanical actions, e.g., sintering, melting, and/or other electrical, mechanical, electromechanical, electrochemical, and/or chemical coupling methods are envisioned as being within the scope of the present disclosure.

PBF system 100 can also include a build floor 111 positioned within a powder bed receptacle. The walls of the powder bed receptacle 112 generally define the boundaries of the powder bed receptacle, which is sandwiched between the walls 112 from the side and abuts a portion of the build floor 111 below. Build floor 111 can progressively lower build plate 107 so that depositor 101 can deposit a next layer. The entire mechanism may reside in a chamber 113 that can enclose the other components, thereby protecting the equipment, enabling atmospheric and temperature regulation and mitigating contamination risks. Depositor 101 can include a hopper 115 that contains a powder 117, such as a metal powder, and a leveler 119 that can level the top of each layer of deposited powder.

Referring specifically to FIG. 1A, this figure shows PBF system 100 after a slice of build piece 109 has been fused, but before the next layer of powder has been deposited. In fact, FIG. 1A illustrates a time at which PBF system 100 has already deposited and fused slices in multiple layers, e.g., 200 individual layers, to form the current state of build piece 109, e.g., formed of 200 individual slices. The multiple individual layers already deposited have created a powder bed 121, which includes powder that was deposited but not fused.

Figure 1B:
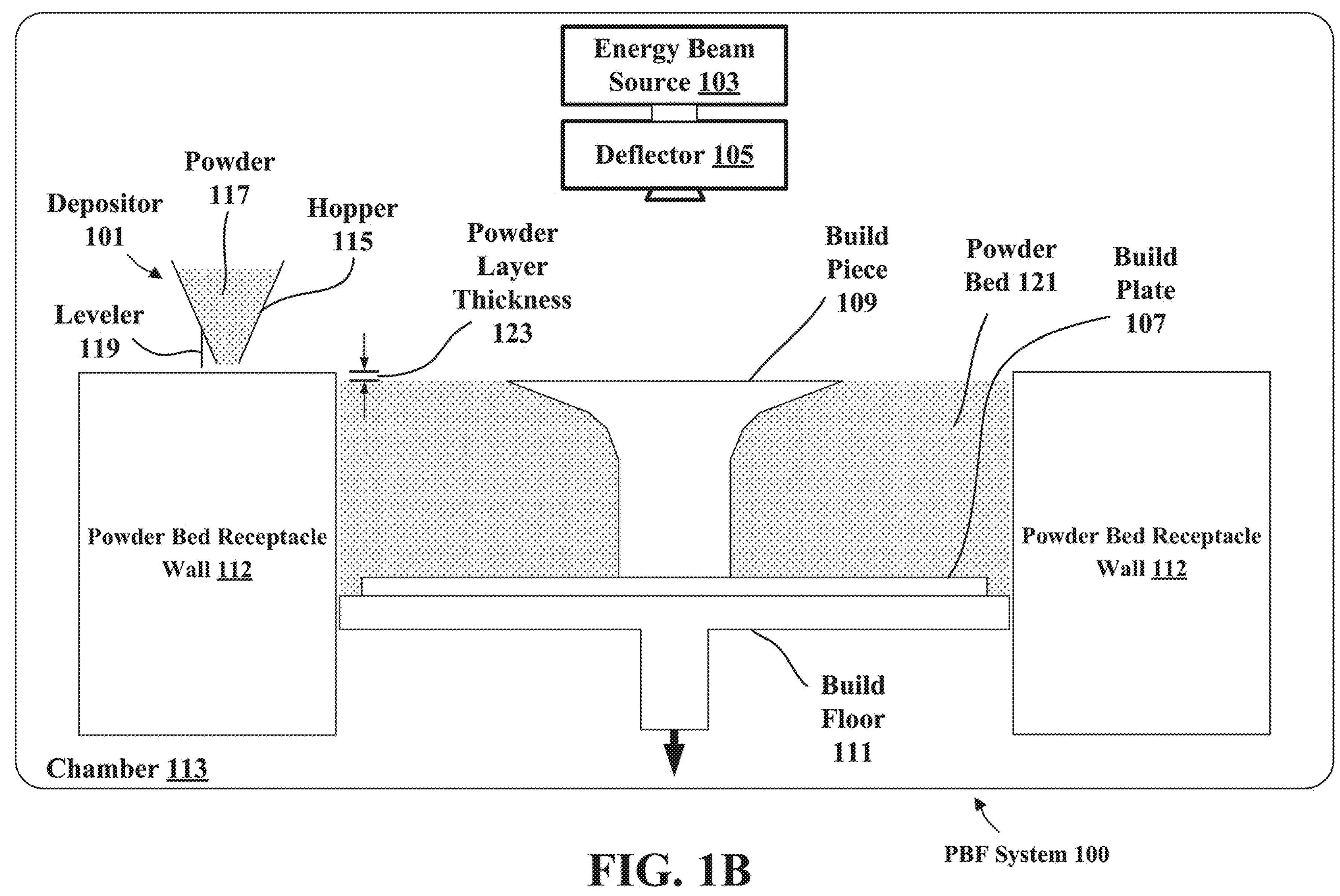

FIG. 1B shows PBF system 100 at a stage in which build floor 111 can lower by a powder layer thickness 123. The lowering of build floor 111 causes build piece 109 and powder bed 121 to drop by powder layer thickness 123, so that the top of build piece 109 and powder bed 121 are lower than the top of powder bed receptacle wall 112 by an amount equal to the powder layer thickness 123. In this way, for example, a space with a consistent thickness equal to powder layer thickness 123 can be created over the tops of build piece 109 and powder bed 121.

Figure 1C:
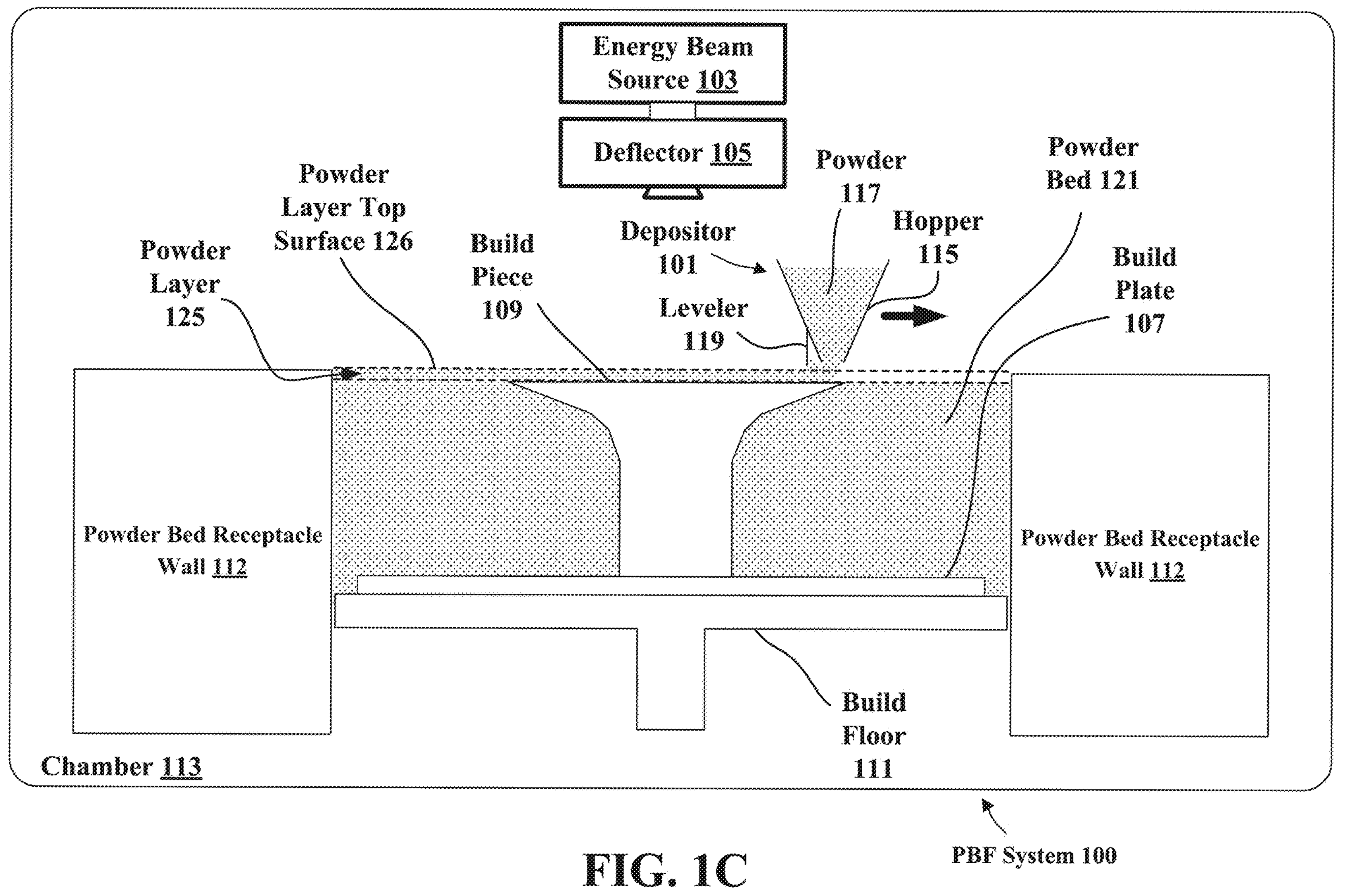

FIG. 1C shows PBF system 100 at a stage in which depositor 101 is positioned to deposit powder 117 in a space created over the top surfaces of build piece 109 and powder bed 121 and bounded by powder bed receptacle walls 112. In this example, depositor 101 progressively moves over the defined space while releasing powder 117 from hopper 115. Leveler 119 can level the released powder to form a powder layer 125 that leaves powder layer top surface 126 configured to receive fusing energy from energy beam source 103. Powder layer 125 has a thickness substantially equal to the powder layer thickness 123 (see FIG. 1B). Thus, the powder in a PBF system can be supported by a powder material support structure, which can include, for example, a build plate 107, a build floor 111, a build piece 109, walls 112, and the like. It should be noted that the illustrated thickness of powder layer 125 (i.e., powder layer thickness 123 (FIG. 1B)) is greater than an actual thickness used for the example involving the 200 previously-deposited individual layers discussed above with reference to FIG. 1A.

Figure 1D:
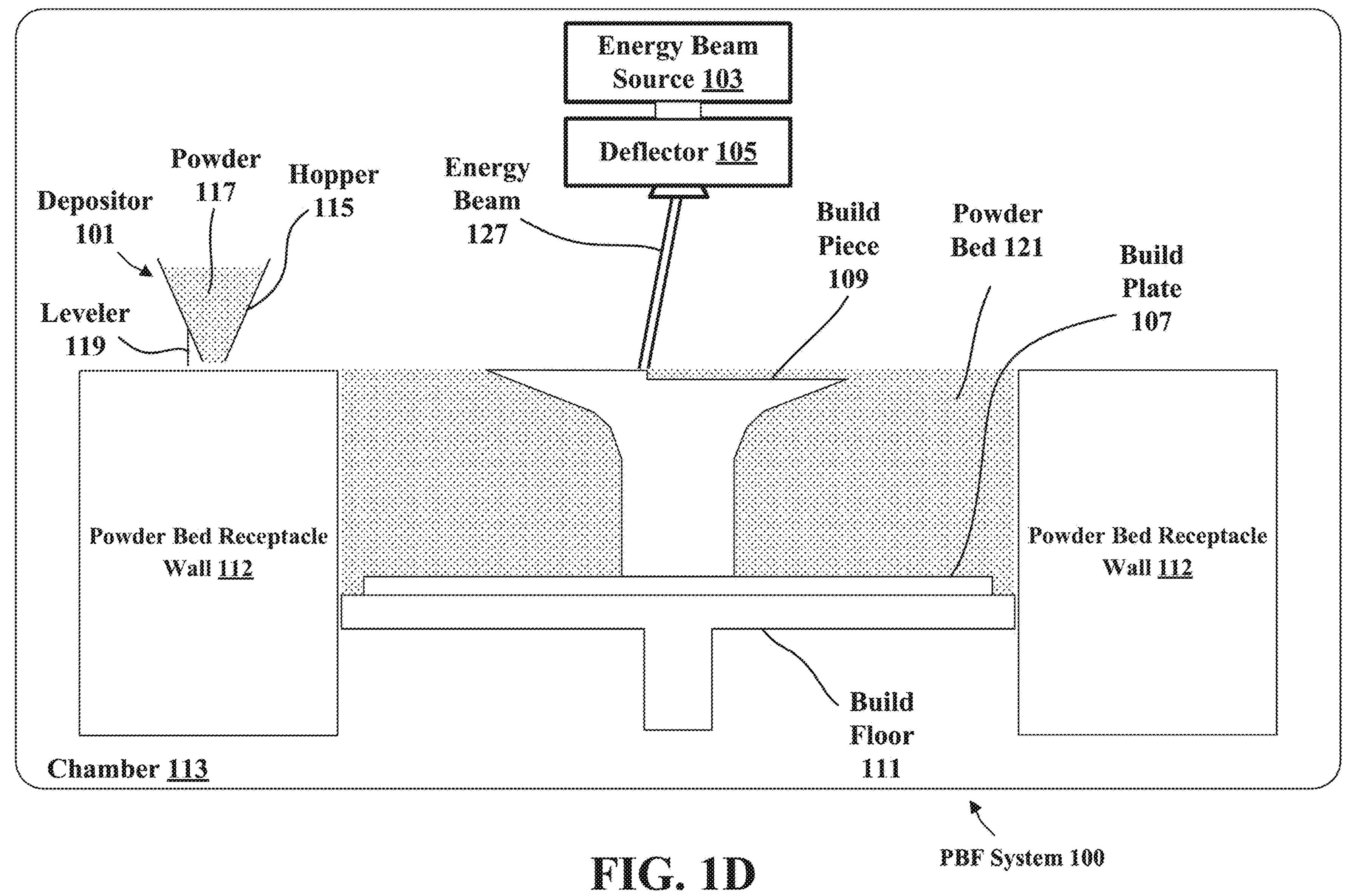

FIG. 1D shows PBF system 100 at a stage in which, following the deposition of powder layer 125 (FIG. 1C), energy beam source 103 generates an energy beam 127 and deflector 105 applies the energy beam to fuse the next slice in build piece 109. In various exemplary embodiments, energy beam source 103 can be an electron beam source, in which case energy beam 127 constitutes an electron beam. Deflector 105 can include deflection plates that can generate an electric field or a magnetic field that selectively deflects the electron beam to cause the electron beam to scan across areas designated to be fused. In various embodiments, energy beam source 103 can be a laser, in which case energy beam 127 is a laser beam. Deflector 105 can include an optical system that uses reflection and/or refraction to manipulate the laser beam to scan selected areas to be fused.

In various embodiments, the deflector 105 can include one or more gimbals and actuators that can rotate and/or translate the energy beam source to position the energy beam. In various embodiments, energy beam source 103 and/or deflector 105 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

Figure 1E:
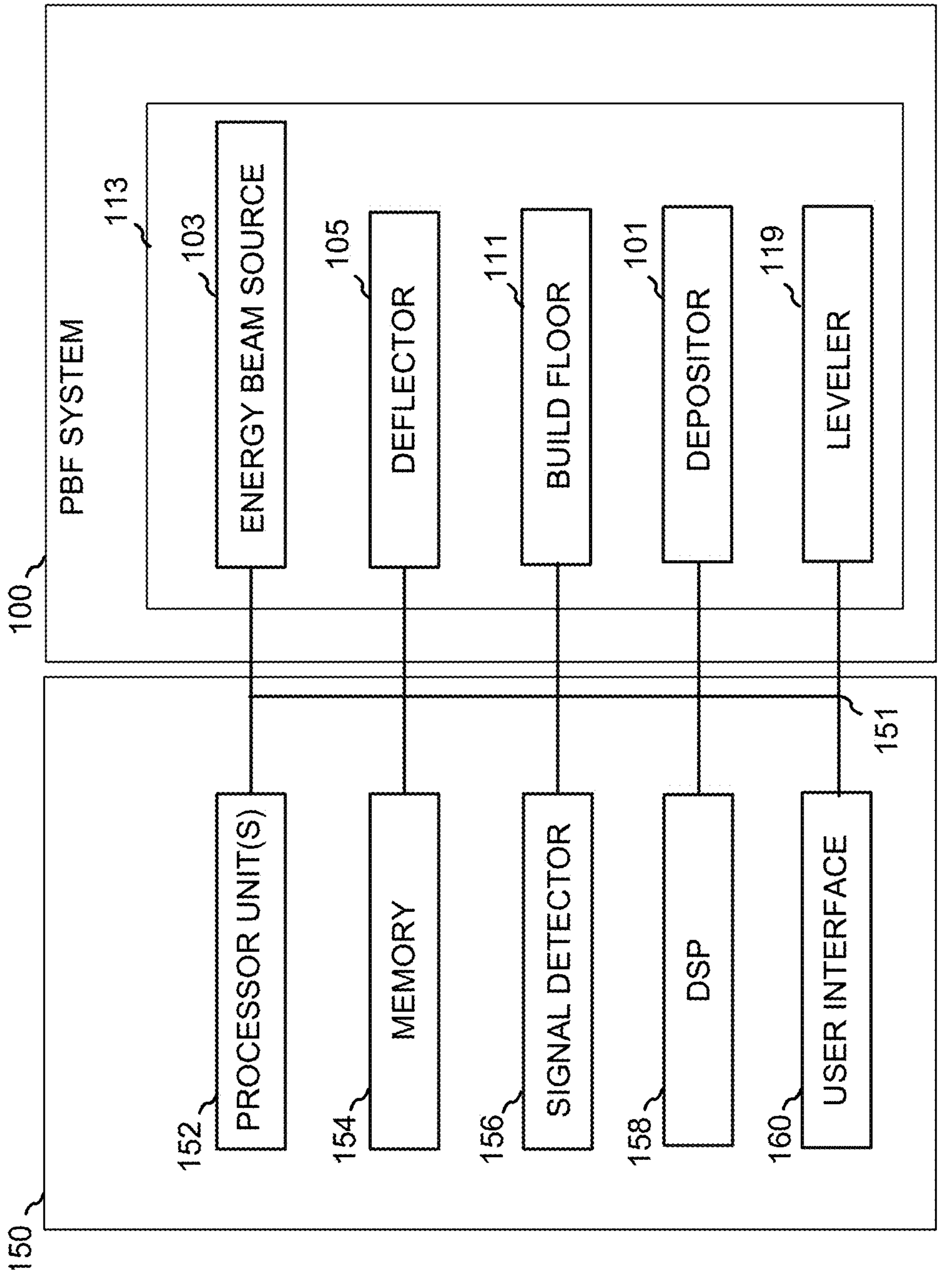
FIG. 1E illustrates a functional block diagram of a 3-D printer system in accordance with an aspect of the present disclosure.

FIG. 1E illustrates a functional block diagram of a 3-D printer system in accordance with an aspect of the present disclosure.

In an aspect of the present disclosure, control devices and/or elements, including computer software, may be coupled to PBF system 100 to control one or more components within PBF system 100. Such a device may be a computer 150, which may include one or more components that may assist in the control of PBF system 100. Computer 150 may communicate with a PBF system 100, and/or other AM systems, via one or more interfaces 151. The computer 150 and/or interface 151 are examples of devices that may be configured to implement the various methods described herein, that may assist in controlling PBF system 100 and/or other AM systems.

In an aspect of the present disclosure, computer 150 may comprise at least one processor unit 152, memory 154, signal detector 156, a digital signal processor (DSP) 158, and one or more user interfaces 160. Computer 150 may include additional components without departing from the scope of the present disclosure.

The computer 150 may include at least one processor unit 152, which may assist in the control and/or operation of PBF system 100. The processor unit 152 may also be referred to as a central processing unit (CPU). Memory 154, which may include both read-only memory (ROM) and random access memory (RAM), may provide instructions and/or data to the processor. A portion of the memory 154 may also include non-volatile random access memory (NVRAM). The processor 152 typically performs logical and arithmetic operations based on program instructions stored within the memory 154. The instructions in the memory 154 may be executable (by the processor unit 152, for example) to implement the methods described herein.

The processor unit 152 may comprise or be a component of a processing system implemented with one or more processors. The one or more processors may be implemented with any combination of general-purpose microprocessors, microcontrollers, digital signal processors (DSPs), floating point gate arrays (FPGAs), programmable logic devices (PLDs), controllers, state machines, gated logic, discrete hardware components, dedicated hardware finite state machines, or any other suitable entities that can perform calculations or other manipulations of information.

The processor unit 152 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, RS-274 instructions (G-code), numerical control (NC) programming language, and/or any other suitable format of code). The instructions, when executed by the one or more processors, cause the processing system to perform the various functions described herein.

The computer 150 may also include a signal detector 156 that may be used to detect and quantify any level of signals received by the computer 150 for use by the processing unit 152 and/or other components of the computer 150. The signal detector 156 may detect such signals as energy beam source 103 power, deflector 105 position, build floor 111 height, amount of powder 117 remaining in depositor 101, leveler 119 position, and other signals. Signal detector 156, in addition to or instead of processor unit 152 may also control other components as described with respect to the present disclosure. The computer 150 may also include a DSP 158 for use in processing signals received by the computer 150. The DSP 158 may be configured to generate instructions and/or packets of instructions for transmission to PBF system 100.

The computer 150 may further comprise a user interface 160 in some aspects. The user interface 160 may comprise a keypad, a pointing device, and/or a display. The user interface 160 may include any element or component that conveys information to a user of the computer 150 and/or receives input from the user.

The various components of the computer 150 may be coupled together by a bus system 151. The bus system 151 may include a data bus, for example, as well as a power bus, a control signal bus, and a status signal bus in addition to the data bus. Components of the computer 150 may be coupled together or accept or provide inputs to each other using some other mechanism.

Although a number of separate components are illustrated in FIG. 1E, one or more of the components may be combined or commonly implemented. For example, the processor unit 152 may be used to implement not only the functionality described above with respect to the processor unit 152, but also to implement the functionality described above with respect to the signal detector 156, the DSP 158, and/or the user interface 160. Further, each of the components illustrated in FIG. 1E may be implemented using a plurality of separate elements.

By way of example, an element, or any portion of an element, or any combination of elements may be implemented using one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors may execute software as that term is described above.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, compact disc (CD) ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), floppy disk and Blu-ray disc where disks usually reproduce data magnetically, while discs reproduce data optically with lasers. Thus, computer readable medium comprises a non-transitory computer readable medium (e.g., tangible media).

Robotic Assembly Environment

Figure 2:
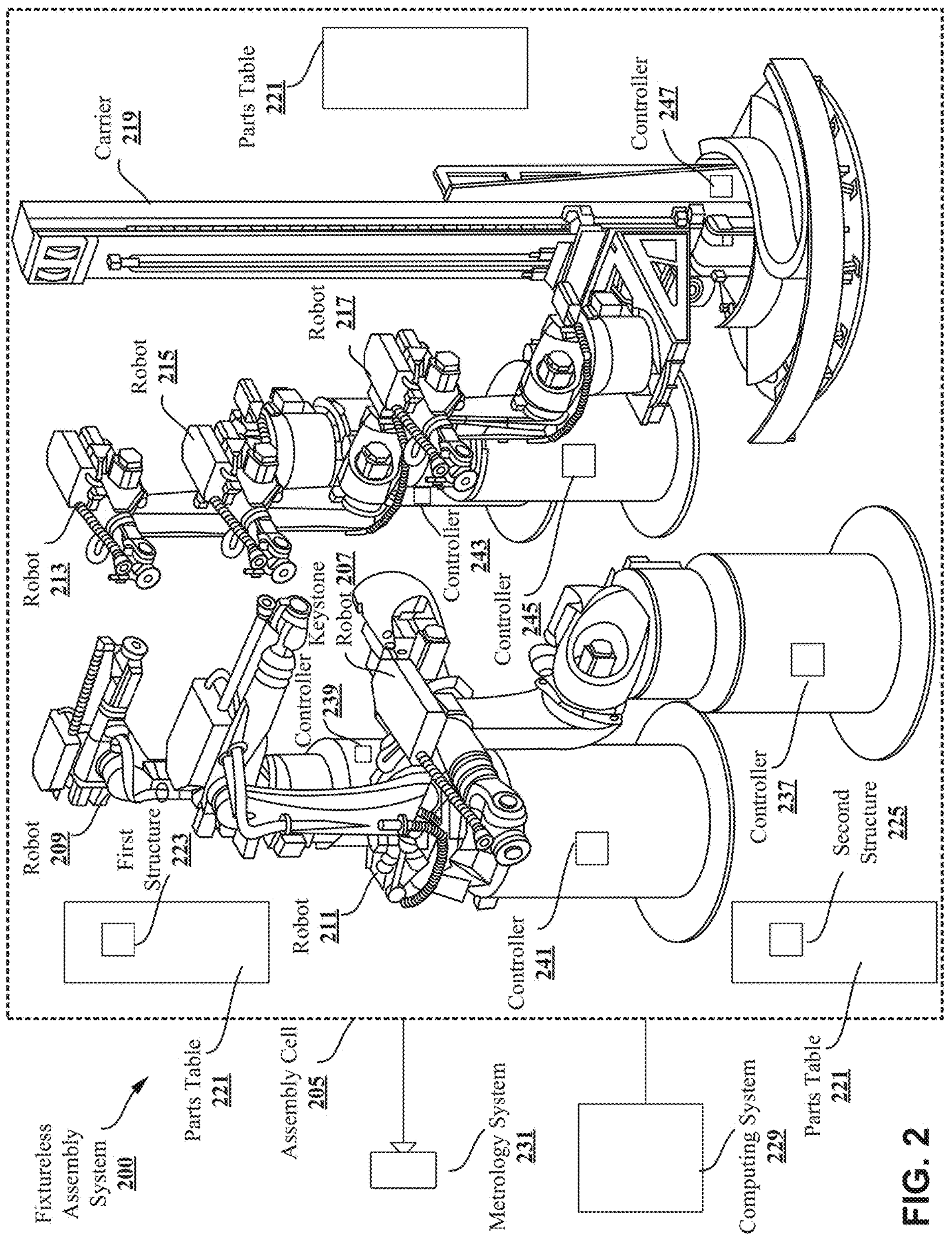
FIG. 2 illustrates an example of an additively manufactured hollow node in accordance with an aspect of the present disclosure.

FIG. 2 illustrates a perspective view of an example of a fixtureless assembly system 200. Fixtureless assembly system 200 may be employed in various operations associated with fixtureless assembly of a vehicle, such as robotic assembly of a node-based vehicle. Fixtureless assembly system 200 may include one or more elements associated with at least a portion of the assembly of a vehicle without any fixtures. For example, one or more elements of fixtureless assembly system 200 may be configured for one or more operations in which a first structure is joined with one or more other structures without the use of any fixtures during robotic assembly of a node-based vehicle.

An assembly cell 205 may be configured at the location of fixtureless assembly system 200. Assembly cell 205 may be a vertical assembly cell. Within assembly cell 205, fixtureless assembly system 200 may include a set of robots 207, 209, 211, 213, 215, 217. Robot 207 may be referred to as a keystone robot. Fixtureless assembly system 200 may include parts tables 221 that can hold parts and structures for the robots to access. For example, a first structure 223 and a second structure 225 may be positioned on one of parts tables 221 to be picked up by the robots and assembled together. In various embodiments, one or more of the structures can be an additively manufactured structure, such as a complex node.

Fixtureless assembly system 200 may also include a computing system 229 to issue commands to the various controllers of the robots of assembly cell 205. In this example, computing system 229 is communicatively connected to the robots through wireless communication. Fixtureless assembly system 200 may also include a metrology system 231 that can accurately measure the positions of the robotic arms of the robots and/or the structures held by the robots.

In contrast to conventional robotic assembly factories, structures can be assembled without fixtures in fixtureless assembly system 200. For example, structures need not be connected within any fixtures, such as the fixtures described above. Instead, at least one of the robots in assembly cell 205 may provide the functionality expected from fixtures. For example, robots may be configured to directly contact (e.g., using an end effector of a robotic arm) structures to be assembled within assembly cell 205 so that those structures may be engaged and retained without any fixtures. Further, at least one of the robots may provide the functionality expected from the positioner and/or fixture table. For example, keystone robot 207 may replace a positioner and/or fixture table in fixtureless assembly system 200.

Keystone robot 207 may include a base and a robotic arm. The robotic arm may be configured for movement, which may be directed by computer-executable instructions loaded into a processor communicatively connected with keystone robot 207. Keystone robot 207 may contact a surface of assembly cell 205 (e.g., a floor of the assembly cell) through the base.

Keystone robot 207 may include and/or be connected with an end effector that is configured to engage and retain a first structure, e.g., a portion of a vehicle. An end effector may be a component configured to interface with at least one structure. Examples of the end effectors may include jaws, grippers, pins, or other similar components capable of facilitating fixtureless engagement and retention of a structure by a robot. In some embodiments, the first structure may be a section of a vehicle chassis, body, frame, panel, base piece, and the like. For example, the first structure may comprise a floor panel.

In some embodiments, keystone robot 207 may retain the connection with a first structure through an end effector while a set of other structures is connected (either directly or indirectly) to the first structure. Keystone robot 207 may be configured to engage and retain the first structure without any fixtures—e.g., none of the fixtures described above may be present in fixtureless assembly system 200. In some embodiments, structures to be retained by at least one of the robots (e.g., the first structure) may be additively manufactured or co-printed with one or more features that facilitate engagement and retention of those structures by the at least one of the robots without the use of any fixtures.

In retaining the first structure, keystone robot 207 may position (e.g., move) the first structure; that is, the position of the first structure may be controlled by keystone robot 207 when retained by the keystone robot. Keystone robot 207 may retain the first structure by holding or grasping the first structure, e.g., using an end effector of a robotic arm of the keystone robot. For example, keystone robot 207 may retain the first structure by causing gripper fingers, jaws, and the like to contact one or more surfaces of the first structure and apply sufficient pressure thereto such that the keystone robot controls the position of the first structure. That is, the first structure may be prevented from moving freely in space when retained by keystone robot 207, and movement of the first structure may be constrained by the keystone robot. As described above, the first structure may include one or more features that facilitates the fixtureless engagement and retention of the first structure by keystone robot 207.

As other structures (including subassemblies, substructures of structures, etc.) are connected to the first structure, keystone robot 207 may retain the engagement with the first structure through the end effector. The aggregate of the first structure and one or more structures connected thereto may be referred to as a structure itself, but may also be referred to as an assembly or a subassembly. Keystone robot 207 may retain an engagement with an assembly once the keystone robot has engaged the first structure.

In some embodiments, robots 209 and 211 of assembly cell 205 may be similar to keystone robot 207 and, thus, may include respective end effectors configured to engage with structures that may be connected with the first structure when retained by the keystone robot. In some embodiments, robots 209, 211 may be referred to as assembly robots and/or materials handling robots.

In some embodiments, robot 213 of assembly cell 205 may be used to affect a structural connection between the first structure and the second structure. For instance, robot 213 may be referred to as a structural adhesive robot. Structural adhesive robot 213 may be similar to the keystone robot 207, except the structural adhesive robot may include a tool at the distal end of the robotic arm that is configured to apply structural adhesive to at least one surface of structures fixturelessly retained by the keystone robot and structures fixturelessly retained by assembly robots 209, 211 before or after the structures are positioned at joining proximities with respect to other structures for joining with the other structures. The joining proximity can be a position that allows a first structure to be joined to a second structure. For example, in various embodiments, the first and second structures may be joined though the application of an adhesive while the structures are within the joining proximity and subsequent curing of the adhesive.

In various embodiments a quick-cure adhesive may be additionally applied to join the structures quickly and retain the structures so that the structural adhesive can cure without both robots holding the structures. In this regard, robot 215 of fixtureless assembly system 200 may be used to apply quick-cure adhesive and to cure the adhesive quickly. In this example embodiment, a quick-cure UV adhesive may be used, and robot 215 may be referred to as a UV robot. UV robot 215 may be similar to keystone robot 207, except the UV robot may include a tool at the distal end of the robotic arm that is configured to apply a quick-cure UV adhesive and to cure the adhesive, e.g., when the first structure is positioned within the joining proximity with respect to the second structure. That is, UV robot 215 may cure an adhesive after the adhesive is applied to the first structure and/or second structure when the structures are within the joining proximity obtained through direction of at least one of the robotic arms of keystone robot 207 and/or assembly robots 209, 211.

In various embodiments, a robot may be used for multiple different roles. For example, robot 217 may perform the role of an assembly robot, such as assembly robots 209, 211, and the role of a UV robot, such as UV robot 215. In this regard, robot 217 may be referred to as an "assembly/UV robot." Assembly/UV robot 217 may offer functionality similar to each of the assembly robots 209, 211 when the distal end of the robotic arm of the assembly/UV robot includes an end effector (e.g., connected by means of a tool flange). However, assembly/UV robot 217 may offer functionality similar to UV robot 215 when the distal end of the robotic arm of the assembly/UV robot includes a tool configured to applied UV adhesive and to emit UV light to cure the UV adhesive.

The quick-cure adhesive applied by UV robot 215 and assembly/UV robot 217 may provide a partial adhesive bond in that the adhesive may retain the relative positions of a first structure and a second structure within the joining proximity until the structural adhesive may be cured to permanently join the first structure and the second structure.

In assembling at least a portion of a vehicle in assembly cell 205, the second structure may be joined directly to the first structure by directing the various robots 207, 209, 211, 213, 215, 217. Additional structures may be indirectly joined to the first structure. For example, the first structure may be directly joined to the second structure through movement(s) of keystone robot 207, structural adhesive robot 213, at least one assembly robot 209, 211, and/or UV robot 215. Thereafter, the first structure, joined with the second structure, may be indirectly joined to an additional structure as the additional structure is directly joined to the second structure. Thus, the first structure, which may continue to be retained by keystone robot 207, may evolve throughout an assembly process as additional structures are directly or indirectly joined to it.

In some embodiments, assembly robots 209, 211 may fixturelessly join two or more structures together, e.g., with a partial, quick-cure adhesive bond, before fixturelessly joining those two or more structures with the first structure retained by keystone robot 207. The two or more structures that are joined to one another prior to being joined with a structural assembly may also be a structure, and may further be referred to as a subassembly. Accordingly, when a structure forms a portion of a structural subassembly that is connected with the first structure through movements of keystone robot 207, structural adhesive robot 213, at least one assembly robot 209, 211, and UV robot 215, a structure of the structural subassembly may be indirectly connected to the first structure when the structural subassembly is joined to a structural assembly including the first structure.

In some embodiments, the structural adhesive may be applied, e.g., deposited in a groove of one of the structures, before the first and second structures are brought within the joining proximity. For example, structural adhesive robot 213 may include a dispenser for a structural adhesive and may apply the structural adhesive prior to the structures being brought within the joining proximity. In some embodiments, a structural adhesive may be applied after a structural assembly is fully constructed (that is, once each structure of the portion of the vehicle is joined to the first structure). For example, the structural adhesive may be applied to one or more joints or other connections between the first structure and the second structure. In some embodiments, the structural adhesive may be applied separately from fixtureless assembly system 200.

After the assembly is complete, i.e., all of the structures have been assembled, retained with a partial adhesive bond, with structural adhesive having been applied, the structural adhesive may be cured. Upon curing the structural adhesive, the portion of the vehicle may be completed and, therefore, may be suitable for use in the vehicle. For example, a completed structural assembly may meet any applicable industry and/or safety standards defined for consumer and/or commercial vehicles.

According to various embodiments, one or more of robots 207, 209, 211, 213, 215, 217 may be secured to a surface of assembly cell 205 through a respective base of each of the robots. For example, one or more of the robots may have a base that is bolted to the floor of the assembly cell. In various other embodiments, one or more of the robots may include or may be connected with a component configured to move the robot within assembly cell 205. For example, a carrier 219 in assembly cell 205 may be connected to assembly/UV robot 217.

Each of robots 207, 209, 211, 213, 215, 217 may include features that are common across all or some of the robots. For example, all of the robots may include a base, each of which having a surface (e.g., a bottom surface) that contacts assembly cell 205 (e.g., rests on or is secured to a floor of the assembly cell). Each base may have another surface (e.g., a top surface and/or a surface disposed on the base opposite from the surface contacting assembly cell 205) and, at a respective other surface, a base may connect with a proximal end of a respective robotic arm of a respective one of the robots.

In some embodiments, a base may be connected to the proximal end of a robotic arm through at least one rotation and/or translation mechanism. The at least one rotation and/or translation mechanism may provide at least one degree of freedom in movement of an end effector or other tool of the robotic arm. Correspondingly, the at least one rotation and/or translation mechanism may provide at least one degree of freedom in movement of a structure that is engaged and retained by an end effector or other tool of the robotic arm.

Each robotic arm of robots 207, 209, 211, 213, 215, 217 may include a distal end, oppositely disposed from the proximal end of the robotic arm. Each robotic arm of each of the robots may include an end effector and/or a tool, such as an adhesive application tool, curing tool, and so forth. An end effector or a tool may be at the distal end of a robotic arm. In some embodiments, the distal end of a robotic arm may be connected to an end effector or a tool (or tool flange) through at least one rotation and/or translation mechanism, which may provide at least one degree of freedom in movement of the tool and/or movement of a structure engaged and retained by the tool of the robotic arm.

In some embodiments, the distal end of a robotic arm may include a tool flange, and a tool included at the tool flange; for example, a tool may be connected to the distal end of a robotic arm by means of the tool flange. A tool flange may be configured to include a plurality of tools. In this way, for example, the assembly/UV robot 217 may offer functionality similar to each of the assembly robots 209, 211 when a distal end of a robotic arm of the assembly/UV robot 217 includes an end effector (e.g., connected by means of the tool flange). In addition, the assembly/UV robot 217 may offer functionality similar to the UV robot 215 when the distal end of the robotic arm of the assembly/UV robot 217 includes a tool configured to apply UV adhesive and to emit UV light to cure the adhesive.

According to some embodiments, a tool flange and/or tool may provide one or more additional degrees of freedom for rotation and/or translation of a structure engaged and retained by the tool. Such additional degrees of freedom may supplement the one or more degrees of freedom provided through one or more mechanisms connecting a base to the proximal end of a robotic arm and/or connecting the distal end of a robotic arm to the tool (or tool flange). Illustratively, a robotic arm of at least one of robots 207, 209, 211, 213, 215, 217 may include at least one joint configured for rotation and/or translation at a distal and/or proximal end, such as an articulating joint, a ball joint, and/or other similar joint.

One or more of the respective connections of robots 207, 209, 211, 213, 215, 217 (e.g., one or more rotational and/or translational mechanisms connecting various components of one of the robots), a respective tool flange, and/or a respective tool may provide at least a portion (and potentially all) of six degrees of freedom (6DoF) for a structure engaged and retained by the robots. The 6DoF may include forward/backward (e.g., surge), up/down (e.g., heave), left/right (e.g., sway) for translation in space and may further include yaw, pitch, and roll for rotation in space. Access to various portions of a structure may be attainable through one or more of the 6DoF, as opposed to retention of a structure using a fixture, which cannot offer 6DoF in movement of a structure and also blocks access to a significant portion of a structure attached thereto.

Each of the robots 207, 209, 211, 213, 215, 217 may be communicatively connected with a controller, such as a respective one of controllers 237, 239, 241, 243, 245, 247 shown in FIG. 2. Each of controllers 237, 239, 241, 243, 245, 247 may include, for example, a memory and a processor communicatively connected to the memory, and may be similar to the computer 150 and memory 154 as described with respect to FIG. 1E. According to some other embodiments, one or more of controllers 237, 239, 241, 243, 245, 247 may be implemented as a single controller that is communicatively connected to one or more of the robots controlled by the single controller.

Computer-readable instructions for performing fixtureless assembly can be stored on the memories of controllers 237, 239, 241, 243, 245, 247, and the processors of the controllers can execute the instructions to cause robots 207, 209, 211, 213, 215, 217 to perform various fixtureless operations, such as those described above.

Controllers 237, 239, 241, 243, 245, 247 may be communicatively connected to one or more components of an associated robot 207, 209, 211, 213, 215, or 217, for example, via a wired (e.g., bus or other interconnect) and/or wireless (e.g., wireless local area network, wireless intranet) connection. Each of the controllers may issue commands, requests, etc., to one or more components of the associated robot, for example, in order to perform various fixtureless operations.

According to some embodiments, controllers 237, 239, 241, 243, 245, 247 may issue commands, etc., to a robotic arm of the associated robot 207, 209, 211, 213, 215, or 217 and, for example, may direct the robotic arms based on a set of absolute coordinates relative to a global cell reference frame of assembly cell 205. In various embodiments, controllers 237, 239, 241, 243, 245, 247 may issue commands, etc., to tools connected to the distal ends of the robotic arms. For example, the controllers may control operations of the tool, including depositing a controlled amount of adhesive on a surface of the first structure or second structure by an adhesive applicator, exposing adhesive deposited between structures to UV light for a controlled duration by a curing tool, and so forth. In various embodiments, controllers 237, 239, 241, 243, 245, 247 may issue commands, etc., to end effectors at the distal ends of the robotic arms. For example, the controllers may control operations of the end effectors, including, engaging, retaining, and/or manipulating a structure.

According to various other aspects, a computing system, such as computing system 229, similarly having a processor and memory, may be communicatively connected with one or more of controllers 237, 239, 241, 243, 245, 247. In various embodiments, the computing system may be communicatively connected with the controllers via a wired and/or wireless connection, such as a local area network, an intranet, a wide area network, and so forth. In some embodiments, the computing system may be implemented in one or more of controllers 237, 239, 241, 243, 245, 247. In some other embodiments, the computing system may be located outside assembly cell 205.

The processor of the computing system may execute instructions loaded from memory, and the execution of the instructions may cause the computing system to issue commands, etc., to the controllers 237, 239, 241, 243, 245, 247, such as by transmitting a message including the command, etc., to one of the controllers over a network connection or other communication link.

According to some embodiments, one or more of the commands may indicate a set of coordinates and may indicate an action to be performed by one of robots 207, 209, 211, 213, 215, 217 associated with the one of the controllers that receives the command. Examples of actions that may be indicated by commands include directing movement of a robotic arm, operating a tool, engaging a structure by an end effector, rotating and/or translating a structure, and so forth. For example, a command issued by a computing system may cause controller 239 of assembly robot 209 to direct a robotic arm of assembly robot 209 so that the distal end of the robotic arm may be located based on a set of coordinates that is indicated by the command.

The instructions loaded from memory and executed by the processor of the computing system, which cause the controllers to control actions of the robots may be based on computer-aided design (CAD) data. For example, a CAD model of assembly cell 205 (e.g., including CAD models of the physical robots) may be constructed and used to generate the commands issued by the computing system.

Accordingly, in one example of a fixtureless assembly process, multiple robots (e.g., robots 207, 209, 211, 213, 215, and/or 17) are controlled (e.g., by computing system 229 and/or one or more controller(s) 237, 239, 241, 243, 245, 247) to join two structures together within an assembly cell (e.g. a vertical assembly cell such as assembly cell 205). The assembly operations may be performed repeatedly so that multiple structures may be joined for fixtureless assembly of at least a portion of a vehicle (e.g., vehicle chassis, body, panel, and the like). A first material handling robot (e.g., robot 209) may retain (e.g., using an end effector) a first structure (e.g., first structure 223) that is to be joined with a second structure (e.g., second structure 225) similarly retained by a second material handling robot (e.g., robot 211). A structural adhesive dispensing robot (e.g., robot 213) may apply structural adhesive to a surface of the first structure retained by the first robot. The first material handling robot may then position the first structure at a joining proximity with respect to the second structure retained by the second material handling robot. A metrology system (e.g., metrology system 231) may implement a move-measure-correct (MMC) procedure to accurately measure, correct, and move the robotic arms of the robots and/or the structures held by the robots into preferred positions at the joining proximity (e.g. using laser scanning and/or tracking).

The positioned structures (e.g., structures 223, 225) may then be joined together using the structural adhesive and cured (e.g., over time or using heat). However, as the curing rate of the structural adhesive may be relatively long, a quick-cure adhesive robot (e.g., robot 215 or robot 217) additionally applies a quick-cure adhesive to the first and/or second structures when the first and second structures are within the joining proximity, and then the quick-cure adhesive robot switches to an end-effector which emits electromagnetic (EM) radiation (e.g., ultraviolet (UV) radiation) onto the quick-cure adhesive. For example, the quick-cure adhesive robot may apply UV adhesive strips across the surfaces of the first and/or second structures such that the UV adhesive contacts both structures, and then the robot may emit UV radiation onto the UV adhesive strips. In various embodiments, the quick-cure adhesive robot may apply UV adhesive into a retention feature, such as retention feature 304 described below. Upon exposure to the EM radiation, the quick-cure adhesive cures at a faster curing rate than the curing rate of the structural adhesive, thus allowing the first and second structure to be retained in their relative positions without fixtures so that the robots may quickly attend to other tasks (e.g., retaining and joining other parts) without waiting for the structural adhesive to cure. Once the structural adhesive cures, the first and second structures are bonded with structural integrity.

However, as the first and second structures in the joining proximity may be oriented in a variety of positions, the UV adhesive strips contacting the surface(s) or UV adhesive in a retention feature may occasionally move (e.g., drip off the surface, leak out of a retention feature window and drip). For instance, one structure may be positioned upside-down relative to another structure, and the UV adhesive may therefore drip off due to gravity. As a result, when the UV adhesive is cured, the first and second structures may be inadvertently retained in positions that do not provide acceptable tolerance, impacting the structural integrity of the assembly.

Difficulties in applying UV adhesive at the joining proximity may also cause improper retention of structures. For example, the material handling robots retaining the first and second structures in the joining proximity may be tightly packed in the assembly cell. As a result, a quick-cure adhesive robot may have difficulty maneuvering around the material handling robots and applying the UV adhesive to the structures in the joining proximity within this tightly packed area. Moreover, since the metro logy system may also be using laser tracking to perform MMC for these structures in this tightly packed area, the quick-cure adhesive robot may potentially obstruct the lasers and the MMC process when attempting to apply the UV adhesive. As a result, the entire assembly may be impacted. For instance, when assemblies are formed by stacking different parts, the misalignment of one structure may affect the alignment of other parts which the structure supports. Additionally, since structures and subassemblies are frequently moved during the assembly process, an improper retention may cause the structures or subassemblies to deflect or drop from the assembly.

Joint Assembly and Disassembly

Figure 3:
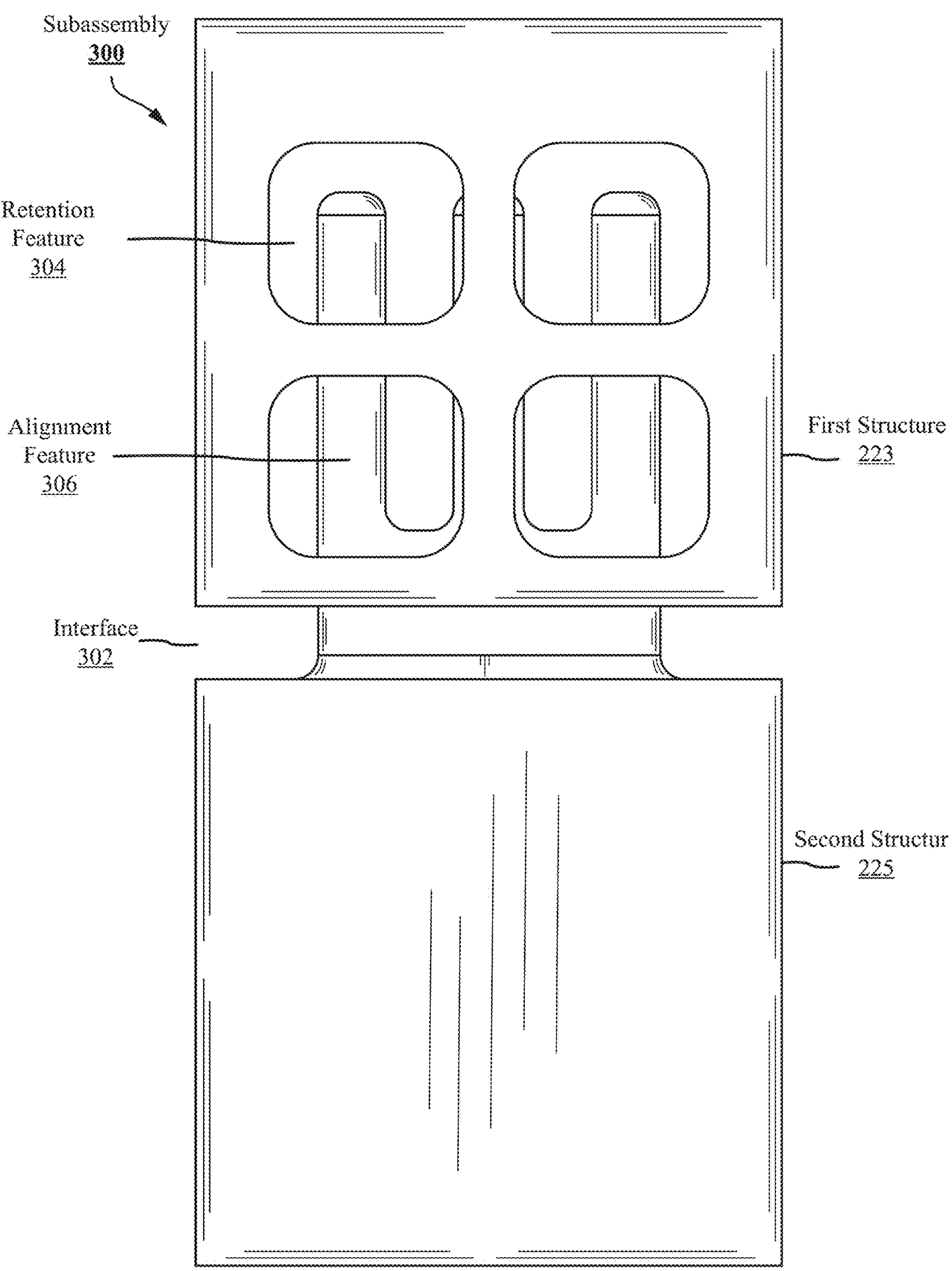
FIG. 3 illustrates a connection at a retention feature between structures in accordance with an aspect of the present disclosure.

FIG. 3 illustrates a connection at a retention feature between structures in accordance with an aspect of the present disclosure.

As shown in FIG. 3, a subassembly 300 may include multiple structures, e.g., first structure 223 and second structure 225. Where first structure 223 and second structure 225 join, e.g., at interface 302, first structure 223 may have a retention feature 304 while second structure 225 may have an alignment feature 306 that is coupled to retention feature 304.

The retention feature 304 may serve multiple functions, e.g., a visual assurance that first structure 223 and second structure 225 are coupled together, alignment of the first structure 223 and second structure 225, etc. Further, retention feature 304 may serve as an insertion point for an adhesive to bond first structure 223 and second structure 225 together.

When first structure 223 and second structure 225 are coupled together, an adhesive, such as a quick-cure adhesive, may be placed in retention feature 304 to bond with alignment feature 306, while a second adhesive, such as a structural adhesive, may be placed elsewhere between first structure 223 and second structure 225. The quick-cure adhesive may provide a quick connection for the subassembly 300 during other assembly operations, such that subassembly can be handled and moved as a single piece for other assembly operations.

Moreover, FIG. 3 illustrates an example of a subassembly 300 including a first structure 223 joined to a second structure 225 using the retention feature 304 and alignment feature 306.

First structure 223 of subassembly 300 may have an adhesive dispensing robot (e.g., robot 213, 215, or 217) inject a quick-cure adhesive into retention feature 304. After the adhesive is dispensed into retention feature 304 and alignment feature 306 of second structure 225 is inserted into the adhesive in the retention feature, the adhesive in the retention feature may be exposed to EM radiation, e.g., ultraviolet (UV) light, to cure the quick-cure adhesive contained within the retention feature 304 and thereby bond the first and second structures to each other. Alignment feature 306, which may be referred to as a tongue, which a material handling robot (e.g., robot 209 or 211) may place into the quick-cure adhesive within the retention feature 304 of the first structure 223, may include a plurality of segments spaced apart from each other, a plurality of openings (e.g., a waffle or grid shape) or may be a solid tongue which contacts the quick-cure adhesive when the alignment feature 306 (tongue) is inserted into the retention feature 304.

In similar embodiments, emitting sources (e.g., radiation source or UV light sources) are generally at the end (e.g., at a distal end of a robotic arm) of a tool. This means that there is no way of measuring a light output while curing a part itself using a single hardware. Instead, there has to be a separate hardware for curing and a separate hardware for performing a verification process of measuring the light output after curing features of the part. Accordingly, a radiometer configured to perform a verification process may be positioned on a separate tool stand in a fixed location. Thus, an assembly system will also involve a separate robot motion (e.g., for the verification process) to go over the part and perform a light output check at the fixed location to verify that the radiation coming out of the radiation source is within specifications to determine whether a cure passes or fails a threshold.

Additionally, in similar embodiments, the tool may be further limited by a bulky size of a radiation head. For example, if there is a curvy concave part, then the tool cannot easily fit up close to the curvy concave part. Instead, a robot may have to spend extra time on each of the joining processes to move the robot to a different fixed location to measure the light output and to verify that the light was functioning properly.

To address the above limitations, the present disclosure describes an apparatus that moves a radiation source (e.g., UV LED chip) away from being located at a distal end of the tool by adding a radiation guide (or light guide) to transmit the light. This results in a much smaller footprint of the tool because the radiation guide has a much smaller footprint cross sectional area as compared to having the radiation source located at the tip. Accordingly, the radiation guide may get closer to small parts and crevices, fit into smaller regions or regions of higher curvature, and allow more flexibility on a design of the part themselves. Furthermore, the shape of the radiation guide allows a photo-diode to be mounted along the radiation guide such that a sensor in the photo-diode may measure a location on a surface of a part where the light from the radiation source is reflecting off of. In this way, the apparatus may combine the curing process with the verification check process that was previously in a separate robot tool and required a separate robot motion to perform the verification check in real time after curing the parts.

Figure 4:
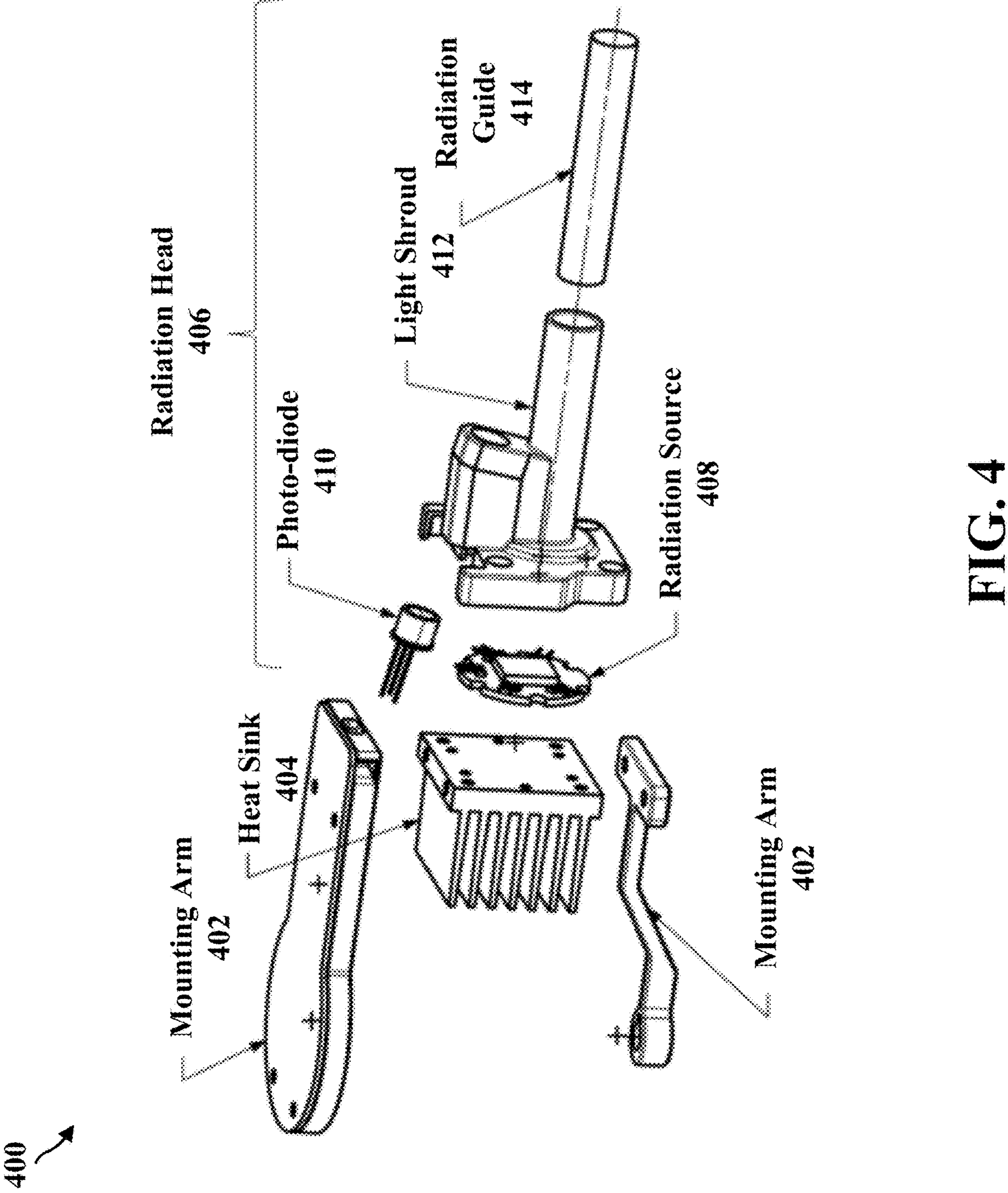
FIG. 4 illustrates an exploded view of a mounting arm and radiation head in accordance with an aspect of the present disclosure.

FIG. 4 illustrates an exploded view of a mounting arm and radiation head in accordance with an aspect of the present disclosure.

The apparatus 400 combines a radiation source 408 (e.g., UV-light source, or LED chip), a radiation guide (or light guide), a spectrum tuned photo-diode 410, and a custom circuit board (not pictured) with a microcontroller which includes the circuitry to irradiate, deliver, and evaluate the emitted light energy from the radiation source 408. The apparatus 400 is designed to use the light energy reflected from the surface of the parts being joined as an in process active evaluation. This allows the evaluation to happen in real-time resulting in no additional process required to insure appropriate light energy was delivered to a cure area. In addition, this also reduces cycle time by eliminating robot motions to transport the emitting device to a stationary radiometer and performing a separate measurement. In this way, each cure may be evaluated rather than at the beginning and end of a group of cures, which improves in-process quality control.

Figure 5:
FIG. 5 illustrates a process of performing a curing process and an in-process verification process in parallel in accordance with an aspect of the present disclosure.
Figure 5:
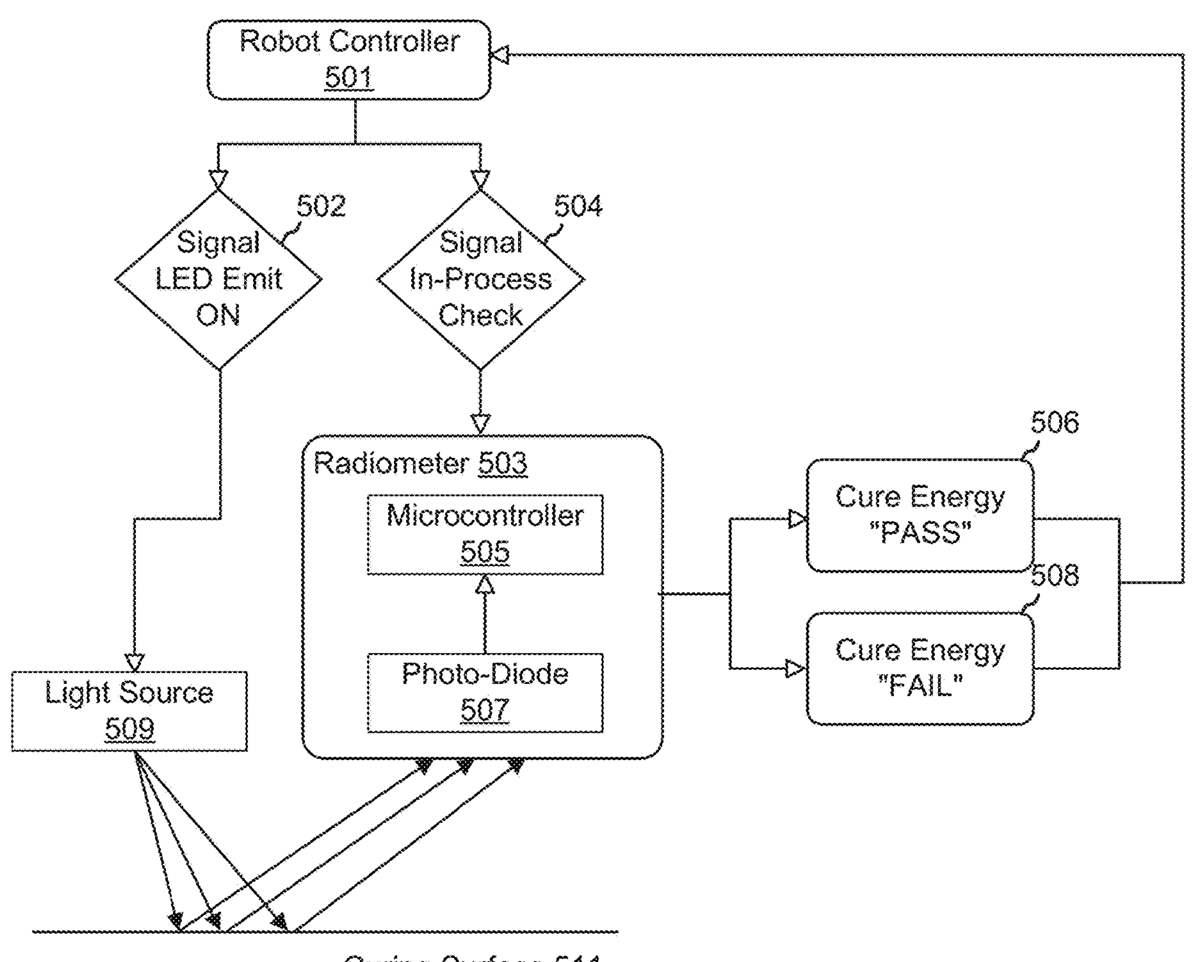
Figure 6:
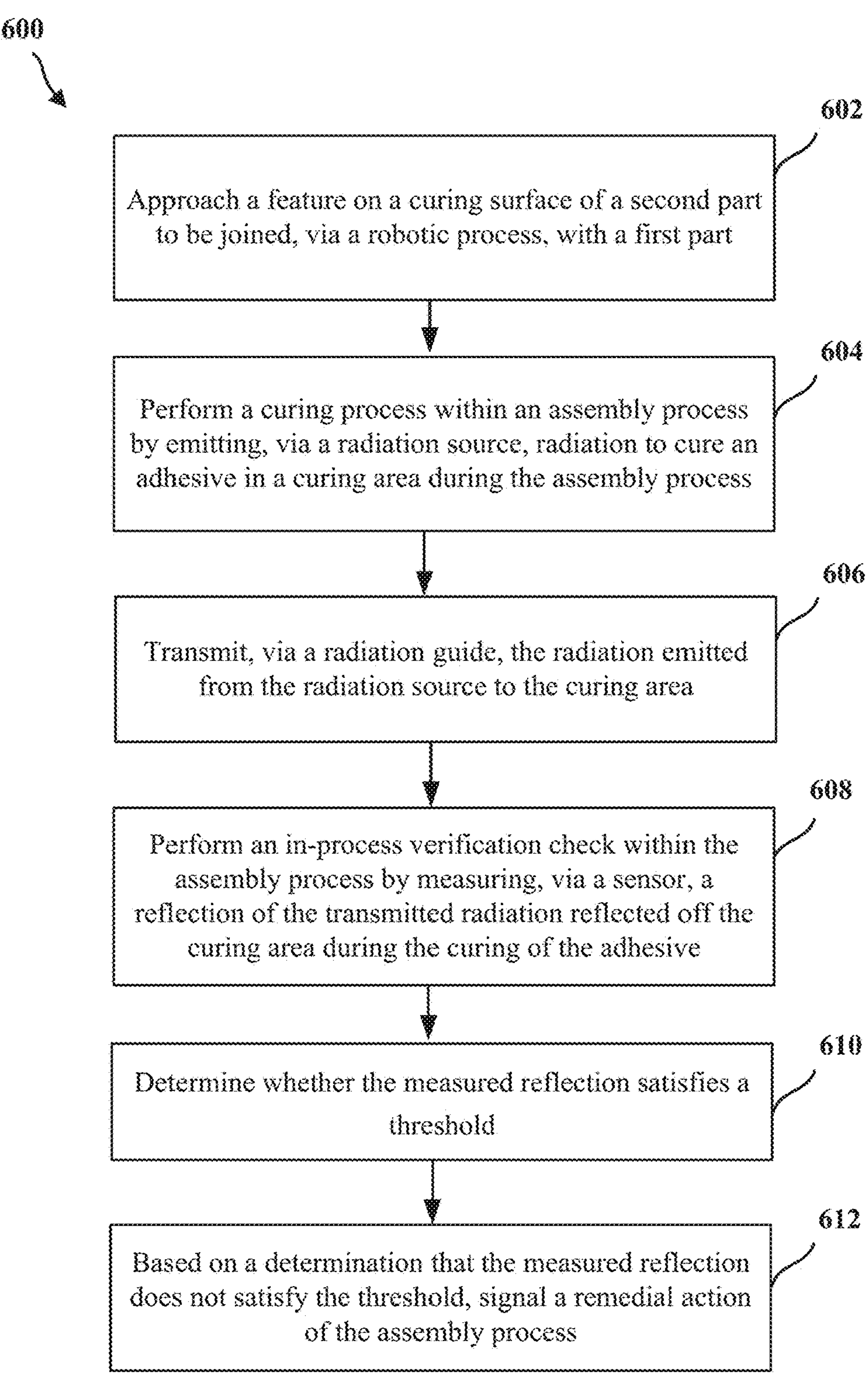
FIG. 6 is a flowchart illustrating an example method in accordance with the systems and methods described herein.
Figure 7:
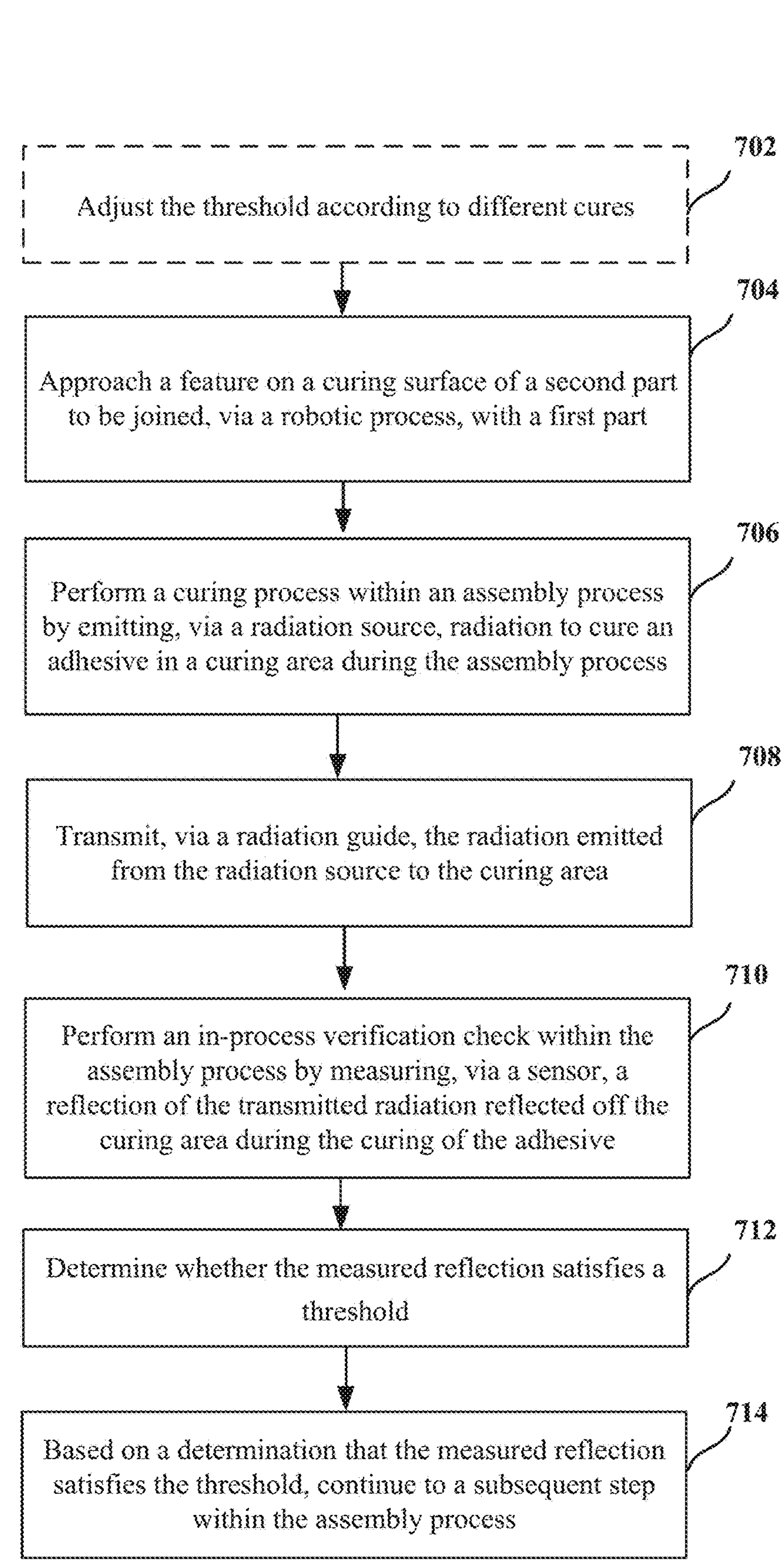
FIG. 7 is a flowchart illustrating an example method in accordance with the systems and methods described herein.

Radiation head 406 is a radiation source 408, e.g., a UV light source and/or associated mechanical and electronic parts, that produces radiation that may be used to cure an adhesive as described with respect to FIGS. 5-7. The radiation head 406 may include, for example, a radiation source 408, a photo-diode 410, a light shroud 412, and a radiation guide 414. Screws and/or other connecting hardware/attachment hardware may also be included to connect the various parts of radiation head 406 together, and may also connect radiation head 406 to mounting arm 402 and heat sink 404.

Heat sink 404 may provide thermal management for the apparatus 400. For example, the heat sink 404 may be fixed to the back of the radiation source 408.

The UV end of arm tool (EOT) (e.g., LED emitter on the radiation source 408 and photo-diode 410) may facilitate the rapid curing of the retention joints which support the frame during an assembly process. In addition, the integration of the radiation guide 414 allows the UV EOT to enter into narrow geometries by elongating the light path via a narrow fused quarts rod. In some examples, the radiation guide 414 may consist of a 10 mm×55 mm fused quarts rod housed in a printed custom metal housing. The housing may also serve to hold the photo-diode 410.

Radiation source 408 may provide radiation, e.g., UV radiation, which may be directed in one or more desired directions. For example, and not by way of limitation, radiation source 408 may direct UV radiation towards light shroud 412.

Radiometer is a combination of the photo-diode 410 and software and circuitry on a printed circuit board (PCB) (not pictured), which enables the system to translate light energy and evaluate the strength to determine if the level satisfies pre-determined thresholds. The radiometer assembly and included circuitry is configured to evaluate various cure profiles and the energy emitted due to reflection at various angles. The code which controls the positioning of the apparatus 400 can contain instructions to evaluate different cures with different threshold levels. In this way, the passing threshold energy can be tuned for each cure type.

The photo-diode 410 may be used for the in process radiometry. The photo-diode 410 is held at an angle to enable the measurement of the reflected light emitted during the curing process. The photo-diode 410 is a wavelength tuned component selected for specific sensitivity to light output. As will be explained in more detail below, the photo-diode 410 is a sensor configured to measure a reflection of light emitted from the radiation source 408 off a surface of the part to be cured.

Light shroud 412 may limit the field of view of radiation source 408 to a given aperture. For example, and not by way of limitation, light shroud 412 may contain radiation from radiation source 408 to a desired exposure beamwidth, such that any radiation from radiation source 408 can be directed toward a desired location and/or minimize radiation emissions in undesired areas.

In addition, the radiation guide 414 extends the light transmission from the radiation source 408 by enabling the radiation source 408 to be placed further away from a front tip of the tool. Specifically, the radiation source 408 is located at an end of the radiation head 406 due to the radiation guide 414 being comprised of fused quartz. The fused quartz transmits the wavelength at a high efficiency with a very low loss. In some examples, fused quarts may retain over 90% of light output. In this way, the radiation guide 414 is able to pull a light from the radiation source 408 through the radiation guide 414 to a front tip of the radiation guide 414. Other materials tend to block the UV light such that the light cannot be efficiently transferred.

Accordingly, the radiation guide 414 provides at least two key functions for the apparatus 400. First, the radiation guide 414 reduces the dimensional footprint of the radiation source at the part that is being cured. This increases design flexibility as it relates to UV feature placement in a region of outer surface curvature. Second, the radiation guide 414 may provide a body on which to mount a photo-diode 410, which a low enough angle of incidence to perform radiometry on the wide variety of geometries encountered during automated assembly. For example, this may include UV features placed on regions of high convex curvature.

The dimensions of mounting arm 402 and radiation head 406 may be selected to allow for accessibility into spaces that are not easily accessed. In an aspect of the present disclosure, selection of the dimensions of mounting arm 402 and radiation head 406 may allow for robot 209, 211, 215, 217 to extend radiation head 406 into small assembly volumes and at compound angles. In such an aspect, retention features can be placed in a wider range of locations on any given component.

In addition, the nose section of the UV EOT may articulate +/90 degrees and can be accurately positionable to five unique positions. These positions may be selected during a virtual commissioning process. In some examples, a servo motor drive the output portion of the UV EOT. The required position may be sent to the UV EOT by a robot and can be changed on-the-fly to reconfigure the end geometry of the end effectuator as necessary to enable access to structure geometries. A secondary feedback encoder may be included in order to have a redundancy in positional information.

The apparatus 400 may also include PCB (not pictured). In some examples, a first PCB supplies, conditions, and regulates power to LED light strings in the UV LED chip (or radiation source 408) and a second PCB includes a microcontroller configured to evaluate the photo-diode 410 and secondary feedback signals. In some examples, the microcontroller may also be configured to convert the information into I/O signals which are sent to the robot as high, low, or fail status for the light output, and positional data for the secondary feedback. The PCB may also include circuitry to allow dimensional calibration of the EOT during mechanical setup.

The combination of the light source (e.g., the radiation source 408) and the light measuring device (photo-diode 410) into a single compact end effector (radiation head 406) enables both the cure and the qualification of the cure in a single event. This reduces the number of required steps of the process and lowers the process time.

FIG. 5 illustrates a process of performing a curing process and an in-process radiometry process in accordance with an aspect of the present disclosure.

Specifically, example 500 of FIG. 5 shows a robot controller 501 configured to control a light source 509 (e.g., radiation source 408 from FIG. 4) to emit light and a radiometer 503 (e.g., photo-diode 410 form FIG. 4) to check the emitted light against a reference value of emitted light. Specifically, the robot controller 501 transmits signals to a secondary PCB board with a microcontroller in the radiometer 503.

The radiometer may include at least the microcontroller 505 and a photo-diode 507. The microcontroller 505 may contains logic to transmit a pass or fail signal back to the robot controller 501.

As an initial matter, a robot (e.g., robots 209, 211, 213, 215, 217 shown in FIG. 2) may be positioned to a part (e.g., a first structure 223 or a second structure 225) that is to be cured.

The robot controller 501 may signal the light source 509 to emit light 502 toward a curing surface 511 of a part that is to be cured. The emitted light source from the light source 509 will then bounce off a curing surface 511. Measuring the reflected light off the curing surface of the part to be cured allows an apparatus to use a same hardware for both a light source and the radiometer and allows the apparatus to be flexible enough to work on arbitrary geometries. This means that even if the surfaces of the parts and the curvatures of the parts have different designs, each unique design may be accommodated by the apparatus.

At the same time as signaling the light source 509 to emit light 502, the robot controller 501 may also signal the radiometer 503 to initiate an in-process verification check 504 for measuring the reflected emitted light by the photo-diode 507. The microcontroller 505 on the radiometer 503 will also determine whether the emitted light passes 506 or fails 508 according to a threshold based on the measurement taken by the photo-diode 507. This in turn signals to the robot controller 501 whether the emitted light produced a passing cure or a defective cure based on the threshold. In some examples, the thresholds may be saved on the micro-controller 505. The benefit of this is providing instantaneous feedback on the emitted light such that any defects are detected at the exact location and time in the process. This allows the process to pause or an operator to diagnose the defect as soon as it is detected. Accordingly, performing the in-process/verification check at the same time or in parallel with a curing process may also cut out a significant amount of time from the assembly process.

In addition, the microcontroller 505 may also adjust, control, and set the thresholds since the reflection of emitted lights may be different due to different materials, finishes, or surfaces of the curing surface 511. In other words, the radiometer 503 may be easily adapted to different characteristics and materials.

If the process stops on a fail, a user may intervene at the process to determine the cause of the defect. For example, a fail situation may involve the photo-diode 507 not detecting enough light. In this case, there may be a separate process to adjust the volume of UV or to perform the cure again.

It is beneficial to evaluate any issues during the process upon detection of a defect instantaneously rather than at the end of a group of cures because remedial action may be taken at the exact location where a defect was detect. As an illustrative example where remedial action is not taken right when a defect is defected, if there is a low light output and a robot goes through an entire curing process and cures several features, then the low light output defect may not be detected until much later in the process. This means that there may have been several movements between the parts that had the defect. Subsequently, the robot or a user would need to go back and check each of the cures, which is difficult to do. In this scenario, the user may decide to scrap the entire frame.

FIG. 6 is a flowchart 600 illustrating an exemplary process for performing a cure process and an in-process verification check in accordance with the systems and methods described herein. The exemplary process may be implemented, at least in part, using an assembly system and an apparatus 400 shown in FIG. 4. Some aspects may be implemented using other tools, systems, or devices, as is discussed herein. For example, one assembly system may be the fixtureless assembly system 200 discussed in FIG. 2.

In some cases, the method 600 may be performed by a system (e.g., the apparatus 400 shown in FIG. 4), comprising a radiation head including a radiation source, a radiation guide, a sensor, and a controller. As an example, referring back to FIG. 4, a radiation head 406 may include the radiation source 408, the radiation guide 414, a sensor on a photo-diode 410, and a controller (not pictured). In some examples, the system may further comprise a chassis, a heatsink coupled to the light shroud, a gearbox coupled to the chassis, and a mounting arm coupled between the gearbox and heatsink. As an example, referring back to FIG. 4, a radiation head 406 may include the mounting arm 402 coupled between a gearbox (not pictured) and a heat sink 404 coupled to the light shroud 412.

At block 602, the method 600 may include approaching a feature on a curing surface of a second part to be joined, via a robotic process, with a first part. In some examples, the first part and the second part may be additively manufactured retention joints.

At block 604, the method 600 may include performing a curing process within an assembly process by emitting, via a radiation source, radiation to cure an adhesive in a curing area during the assembly process. In some examples, the radiation source may include an ultraviolet (UV) source and the adhesive may include a UV-cured adhesive.

In some examples, radiation head may include a radiation source configured to emit radiation to cure an adhesive in a curing area during an assembly process. As an example, referring back to FIG. 5, a light source 509 may emit radiation off a curing surface 511.

At block 606, the method 600 may include transmitting, via a radiation guide, the radiation emitted from the radiation source to the curing area. In some examples, the radiation guide may comprise a fused quartz rod. In some examples, a radiation head may include a radiation guide configured to transmit the radiation emitted from the radiation source to the curing area.

At block 608, the method 600 may include performing an in-process verification check within the assembly process by measuring, via a sensor, a reflection of the transmitted radiation reflected off the curing area during the curing of the adhesive, wherein the sensor is positioned proximate to the radiation guide. In some examples, a radiation head may include a sensor configured to measure a reflection of the transmitted radiation reflected off the curing area during the curing of the adhesive. As an example, referring back to FIG. 5, a photo-diode 507 may be configured to measure a reflection of the transmitted radiation reflected off the curing surface 511 during the curing of the adhesive.

In some examples, the sensor is positioned proximate to the radiation guide. As an example, referring back to FIG. 4, the photo-diode 410 is placed proximate to the radiation guide 414 in the light shroud 412.

At block 610, the method 600 may include determining whether the measured reflection satisfies a threshold. In some examples, emitting the radiation from the radiation source and determining whether the measured reflection satisfies the threshold may be performed in parallel. The combination of the light and the light measuring device into a single compact end effector enables both the cure and the qualification of the cure in a single event. This helps detect a defect at the exact location and time the defect happens and also reduces the number of required steps of the process and lowers the process time.

At block 612, the method 600 may include, based on a determination that the measured reflection does not satisfy the threshold, signal a remedial action of the assembly process. In some examples, the controller may be configured to: based on a determination that the measured reflection does not satisfy the threshold, signal a remedial action of the assembly process. In some examples, the remedial action may include stopping the assembly process. In some examples, the remedial action may include applying additional radiation to the adhesive. In some examples, the remedial action may be signaled based on a delta between the measured reflection and the threshold.

In some examples, a radiation head may include a controller configured to determine whether the measured reflection satisfies a threshold and, based on a determination that the measured surface does not satisfy the threshold, to signal a remedial action of the assembly process.

In some examples, the radiation source, the sensor, and the radiation guide may be combined in an end effector. In some examples, the radiation head may include a light shroud configured to receive the radiation source, the sensor, and the radiation guide. As an example, referring back to FIG. 4, the radiation source 408, the photo-diode 410, and the radiation guide 414 are all combined in a radiation head 406 which may be connected to the end of a keystone robot. In some examples, the end effector may be moveable in an angular movement that changes a direction of the radiation emitting from the radiation source. As an example, referring back to FIG. 2, the robots 209 and 211 of assembly cell 205 may include or be connected to an end effector that is configured to engage with structures that may be connected with the first structure when retained by the keystone robot.

FIG. 7 is a flowchart 700 illustrating an exemplary process for performing a cure process and an in-process verification check in accordance with the systems and methods described herein. The exemplary process may be implemented, at least in part, using an assembly system and an apparatus 400 shown in FIG. 4. Some aspects may be implemented using other tools, systems, or devices, as is discussed herein. Optional aspects are illustrated in dashed lines. For example, one assembly system may be the fixtureless assembly system 200 discussed in FIG. 2.

Optionally, at block 702, the method 700 may include adjusting the threshold according to different cures. The threshold may be adjusted according to different cures due to a reflection of the emitted light being different due to a curing surface having different materials, finishes, surfaces, or the like.

At block 704, the method 700 may include approaching a feature on a curing surface of a second part to be joined, via a robotic process, with a first part.

At block 706, the method 700 may include performing a curing process within an assembly process by emitting, via a radiation source, radiation to cure an adhesive in a curing area during the assembly process.

At block 708, the method 700 may include transmitting, via a radiation guide, the radiation emitted from the radiation source to the curing area.

At block 710, the method 700 may include performing an in-process verification check within the assembly process by measuring, via a sensor, a reflection of the transmitted radiation reflected off the curing area during the curing of the adhesive, wherein the sensor is positioned proximate to the radiation guide.

At block 712, the method 700 may include determining whether the measured reflection satisfies a threshold.

At block 714, the method 700 may include, based on a determination that the measured reflection satisfies the threshold, continuing to a subsequent step within the assembly process.

Advantages Provided by the Present Disclosure

In an aspect of the disclosure, the disclosure provides an apparatus and method for performing a cure and evaluating the cure in parallel. This allows the evaluation of the cure to happen in real-time resulting in no additional process required to ensure appropriate light energy was delivered to a cure area. For instance, improvements include cutting out a significant amount of time from the assembly process by having separate tools perform the curing process and then the evaluation process. Specifically, having a same hardware perform both the curing process and the evaluation process at a same time reduces cycle time by eliminating robot motions to transport the emitting device to a stationary radiometer and performing a separate measurement. In this way, each cure may be evaluated at the point of defect rather than at the beginning and end of a group of cures, which improves in-process quality control. It is beneficial to evaluate any issues during the process upon detection of a defect instantaneously rather than at the end of a group of cures because remedial action may then be taken at the exact location where a defect was detect.

The previous description is provided to enable any person skilled in the art to practice the various aspects described herein. Various modifications to these exemplary embodiments presented throughout this disclosure will be readily apparent to those skilled in the art, and the concepts disclosed herein may be applied to other techniques for printing structures and interconnects. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. A system comprising:

a radiation head including:

a radiation source configured to emit radiation to cure an adhesive in a curing area during an assembly process;

a radiation guide configured to transmit the radiation emitted from the radiation source to the curing area; and a sensor configured to measure a reflection of the transmitted radiation reflected off the curing area during the curing of the adhesive, wherein the sensor is positioned proximate to the radiation guide; and a controller configured to determine whether the measured reflection satisfies a threshold and, based on a determination that the measured reflection does not satisfy the threshold, to signal a remedial action of the assembly process.

2. The system of claim 1, wherein the radiation guide comprises a fused quartz rod.

3. The system of claim 1, wherein emitting the radiation from the radiation source and determining whether the measured reflection satisfies the threshold are performed in parallel.

4. The system of claim 1, wherein the controller is further configured to:

based on a determination that the measured reflection satisfies the threshold, continue to a subsequent step within the assembly process.

5. The system of claim 1, wherein the remedial action includes stopping the assembly process.

6. The system of claim 1, wherein the remedial action includes applying additional radiation to the adhesive.

7. The system of claim 1, wherein the controller is further configured to:

adjust the threshold according to different cures.

8. The system of claim 1, wherein the controller is further configured to:

signal the remedial action based on a delta between the measured reflection and the threshold.

9. The system of claim 1, wherein the radiation head is moveable in an angular movement that changes a direction of the radiation emitting from the radiation head.

10. The system of claim 1, wherein the radiation head further comprises:

a light shroud configured to receive the radiation source, the radiation guide, and the sensor.

11. The system of claim 10, wherein the system further comprises:

a chassis;

a heatsink coupled to the light shroud;

a gearbox coupled to the chassis; and a mounting arm coupled between the gearbox and the heatsink.

12. The system of claim 1, wherein the radiation source includes an ultraviolet (UV) source, and the adhesive includes a UV-cured adhesive.

13. A method comprising:

approaching a feature on a curing surface of a second part to be joined, via a robotic process, with a first part;

performing a curing process within an assembly process by emitting, via a radiation source, radiation to cure an adhesive in a curing area during the assembly process;

transmitting, via a radiation guide, the radiation emitted from the radiation source to the curing area;

performing an in-process verification check within the assembly process by measuring, via a sensor, a reflection of the transmitted radiation reflected off the curing area during the curing of the adhesive, wherein the sensor is positioned proximate to the radiation guide;

determining whether the measured reflection satisfies a threshold; and based on a determination that the measured reflection does not satisfy the threshold, signaling a remedial action of the assembly process.

14. The method of claim 13, wherein the radiation guide comprises a fused quartz rod.

15. The method of claim 13, wherein emitting the radiation from the radiation source and determining whether the measured reflection satisfies the threshold are performed in parallel.

16. The method of claim 13, further comprising:

based on a determination that the measured reflection satisfies the threshold, continuing to a subsequent step within the assembly process.

17. The method of claim 13, wherein the remedial action includes stopping the assembly process.

18. The method of claim 13, wherein the remedial action includes applying additional radiation to the adhesive.

19. The method of claim 13, further comprising:

adjusting the threshold according to different cures.

20. The method of claim 13, wherein the remedial action is signaled based on a delta between the measured reflection and the threshold.

21. The method of claim 13, wherein the radiation source includes an ultraviolet (UV) source, and the adhesive includes a UV-cured adhesive.

22. The method of claim 13, wherein the radiation source, the sensor, and the radiation guide are combined in an end effector.

23. The method of claim 22, wherein the end effector is moveable in an angular movement that changes a direction of the radiation emitting from the radiation source.

24. The method of claim 13, wherein the first part and the second part are additively manufactured retention joints.

* * * * *